(12) United States Patent
Wakaizumi

(10) Patent No.: US 7,241,102 B2
(45) Date of Patent: Jul. 10, 2007

(54) ROBOT

(75) Inventor: Kiyoshi Wakaizumi, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 125 days.

(21) Appl. No.: 10/989,688

(22) Filed: Nov. 16, 2004

(65) Prior Publication Data

US 2005/0135916 A1   Jun. 23, 2005

(30) Foreign Application Priority Data

| Dec. 5, 2003 | (JP) | ............................. 2003-407354 |
| Feb. 4, 2004 | (JP) | ............................. 2004-027926 |
| Feb. 4, 2004 | (JP) | ............................. 2004-027927 |
| Feb. 4, 2004 | (JP) | ............................. 2004-027928 |

(51) Int. Cl.
*B25J 9/10* (2006.01)

(52) U.S. Cl. ................ 414/735; 74/490.01; 74/490.06; 414/917; 901/15; 901/29

(58) Field of Classification Search ................ 414/680, 414/735, 917; 74/490.01, 490.03, 490.06; 901/15, 29
See application file for complete search history.

(56) References Cited

U.S. PATENT DOCUMENTS 6,557,235 B1 * 5/2003 Katz et al. ..................... 29/563
6,974,297 B2 * 12/2005 Brogårdh ..................... 414/680
2004/0028516 A1 * 2/2004 Brogardh ..................... 414/735

FOREIGN PATENT DOCUMENTS

| JP | 07-328872 | 12/1995 |
| JP | 11-114871 | 4/1999 |
| JP | 2001-079284 | 3/2001 |

* cited by examiner

*Primary Examiner*—Donald Underwood
(74) *Attorney, Agent, or Firm*—Nields & Lemack

(57) ABSTRACT

Disclosed is a robot which is compact in structure and may be movable in a large working range, wherein move members 1, 1 may be moved by drive devices 4, 4 respectively along a straight line and in parallel with each other, the drive devices 4, 4 including motors 40, 40 respectively which are individually controlled by a control device 9, so that the move members 1, 1 may be moved at a different speed and may be stopped at different relative positions. The move members 1, 1 are connected to a work holder 3 by means of arms 2, 2, the arms having one end pivotally connected to the move members 1, 1 at the pivots 10, 10 thereof respectively, the arms 2, 2 having the opposite end pivotally connected to the work holder 3 at the pivots 30, 30 thereof respectively. The work holder 3 may hold an optional jig and may be moved in a horizontal plane and in a vertical plane enabling the jig to work in the working plane.

17 Claims, 26 Drawing Sheets

ROBOT

BACKGROUND OF THE INVENTION

The present invention relates to a robot, and more particularly relates to a robot which is compact in structure and may be smoothly operated to work in enlarged and amplified working region.

It is generally known that a robot is driven by a drive mechanism that is a slide unit or a rotation unit including links.

As the robot of slide unit drive type, it may be said that the X-Y robot is typical as disclosed in the Japanese patent application laid open Hei 7-328872. As the robot of rotation unit type, it may be said that the horizontal articulate robot is typical as disclosed in the Japanese patent application laid open Hei 11-114871.

The X-Y robot is generally made mechanically compact including a plurality of straight moving slide units which are arranged normal to each other so as to move the work holder with the straight and composite moving locus of the X-Y coordinates. Therefore, the working range of work holder will not be extended beyond the range which is determined by the X and Y composite coordinates.

As to the horizontal articulate robot, the working range is determined by the pivotal movement of a plurality of arms, and a high speed movement may be obtained. However depending upon a working range, the arms may come to interfere with each resulting in failure of work. Further since a plurality of pivot connections are provided on the base to move the work holder which is operatively connected to the pivots, a big load is given to the base and to the arms. It is, therefore, necessary to increase the strength of the mechanism. In any events, it is difficult to reduce the size of the mechanism. It is, therefore, difficult to use such device of mechanism as a unit to be built in another machine.

It is, therefore, a principal object of the invention to eliminate the defects and disadvantages of the prior art.

SUMMARY OF THE INVENTION

For attaining the object, the robot of the invention comprises at least two move members which are arranged as being movable, at least two links, each of which has one end pivotally connected to each of the move members, a work holder pivotally connected to the opposite end of each of the links, drive means for independently driving the move members, control means for controlling the operation of the drive means.

With this composition, the two move members may be optionally moved and stopped to move and stop the two arms and the work holder in the work plane and in the X-Y directions. The working range of the work holder is determined by the moving range of the move members and the length of the arms.

The move members may be moved along a straight line or a line which is other than the straight line. The move members may be moved in parallel or not in parallel with each other. The two links may be of a same length or of a different length. The length of the arms may be variable.

The two links may be connected to the work holder at one point or at different points thereof.

The drive means may drive the two move members at a same speed or at a different speed. The work holder may be moved with an optional moving locus by regulating the relative moving speed of the two move members.

The work held by the work holder may be processed in a plane in parallel with or vertical to the plane where the move members are moved. In case of the former, it is preferable that the move members are set to move in a vertical plane. In case of the latter, it is preferable that the move members are set to move in a horizontal plane.

The move members may be placed on another move means to enlarge the moving range of the move members.

According to the robot of the invention, a specific mechanism may be provided enlarge the moving region of the move members without enlarging the size of the robot, such that the robot may be used as is built in another machine.

The specific mechanism may include an amplifying mechanism for amplifying the moving distance of the move members which are moved by the drive means, thereby to enlarge the moving range of the move members. Thus moving range of the work holder which is connected to the move members is enlarged. The amplifying mechanism that is used may be such as disclosed, for example, in the Japanese patent application laid open 2001-79284.

Further, a second link may be provided in parallel with at least one of the first two links so as to keep the posture of the work holder as stabilized while the same is moved by the links. However, it is preferable that two second links are provided in parallel with the two first links respectively.

Further, a limiting means may be provided to regulate the relative positions of the two move members within a predetermined range. Preferably, the limiting means includes stoppers for physically regulating the relative positions of the two move members. The limiting means may be a software for controlling the drive means that is driven to move the move members.

DETAILED DESCRIPTION OF THE PREFERRED EMBODIMENTS

The invention will be described in reference to the embodiments as shown in the attached drawings.

Figure 1:
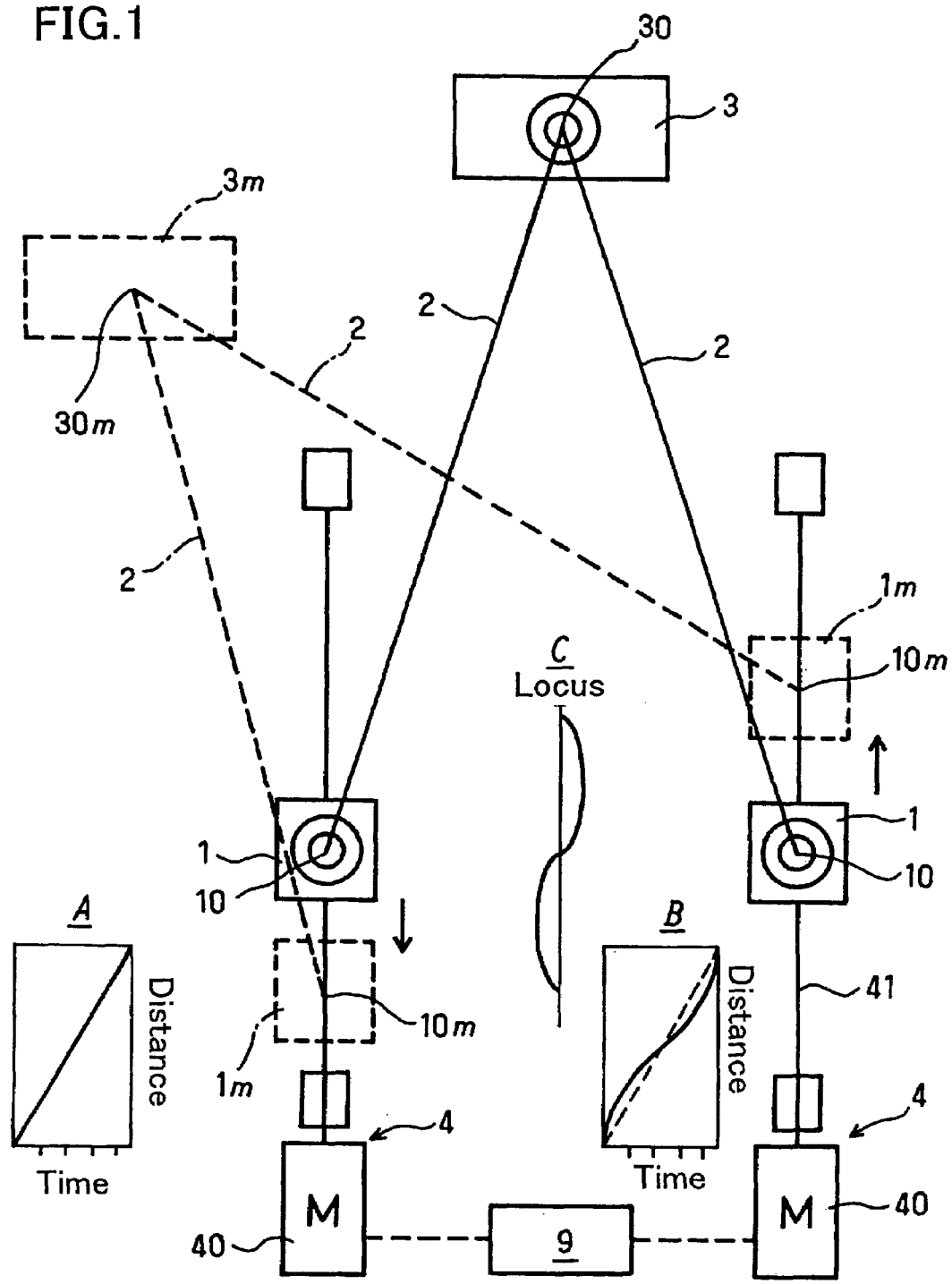
FIG. 1 is a diagram showing one embodiment of the invention.

In FIG. 1, the robot of the invention is provided with two move members 1,1 which may be moved straight in parallel with each other by drive devices 4,4 respectively.

The move members 1,1 may be made to move not straight and non parallel.

According to the embodiment, the drive devices 4,4 include motors 40,40 and ball screws 41,41 respectively. The move member 1 is mounted to the ball screw 41 and is moved straight to-and-fro in accordance with rotation of the ball screw 41 in one or opposite direction.

The motors 40,40 may be individually controlled by a control device 9. The move members 1,1 may be moved at a different speed and may be stopped at a different position.

Arms 2,2 are pivotally connected at one end thereof to the move member 1,1 respectively at the pivots 10,10 thereof. According to the embodiment, the arms 2,2 are of same length. The length may, however, be different from each other if necessary.

Figure 2:
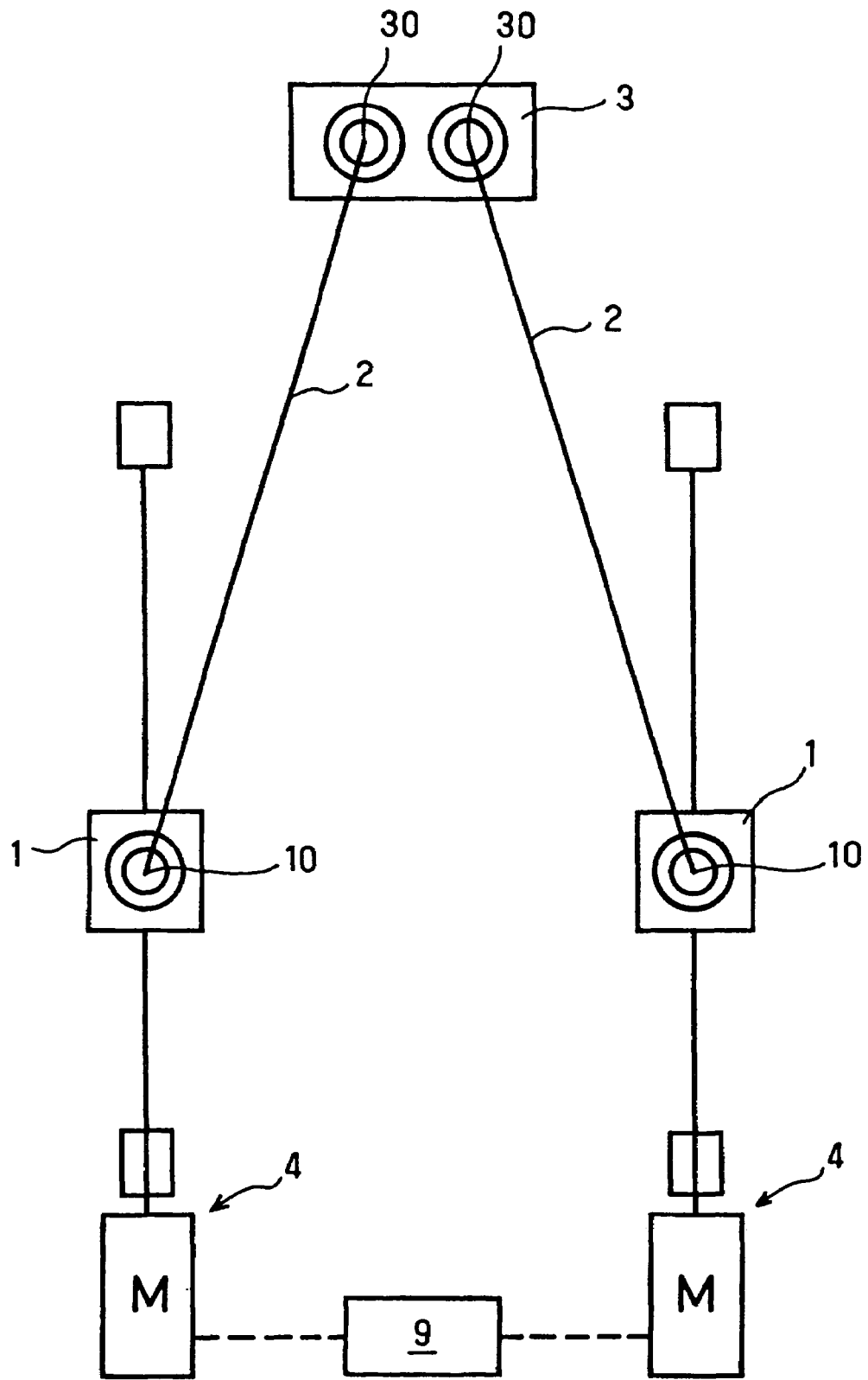
FIG. 2 is a diagram showing another embodiment of the invention.

The arms 2,2 have the opposite end pivotally connected to a work holder 3 at a pivot 30 thereof. The arms 2,2 may be connected to two pivots 30,30 respectively as shown in FIG. 2 so as to stabilize the posture of the work holder 3.

An optional jig may be mounted to the work holder 3 to perform a work while the work holder 3 is moved in a horizontal or vertical plane.

With the robot having such constituent elements, the control device 9 is adapted to control the drive of the motors 40,40 to regulate the position of the move members 1,1, thereby to move the work holder 3 to an optional position in a movable plane. As shown in FIG. 1, in case the move members 1,1 are moved to the positions 1*m*, 1*m* as shown by the dotted lines respectively, the work holder 3 is moved to the position 3*m* as shown by the dotted lines.

The range where the work holder 3 may move is decided by the moving distance of the move members 1,1, the space between the move members 1,1 and the length of the arms 2,2.

Incidentally, the motors 40,40 may be driven at a different speed to move the work holder 3 to an optional position with an optional locus.

For example in FIG. 1, in case the move member 1 on the left side is moved at a constant speed as is identified by the reference mark A while the move member 1 on the right side is moved at a varied speed as is identified by the reference mark B, the work holder 3 is moved through the locus that is a curved line as is identified by the reference mark C.

Thus, according to the invention, the actuators such as the motors 40,40 may be arranged at fixed places respectively. It is, therefore, possible to use the actuators of big size to prevent the deterioration in performance of the device.

Further, it is possible to obtain a large moving range of the work holder 3 as compared with the moving range of the move members 1, 1 while the whole device is made compact.

Further, since the moving range of the work holder 3 is generally square, the jig or the like to be mounted to the work holder 3 may be easily designed.

Further, since the work holder 3 is moved outside of the bases 4,4 where the drive motors 40,40 are arranged respectively, the work may be placed outside of the bases, that is, for the inline working. Namely the device is adapted, for example, to the working wherein the shavings or particles produced by the cutter or drill mounted to the work holder 3 or the adhesives such as dispenser may drop.

Figure 3:
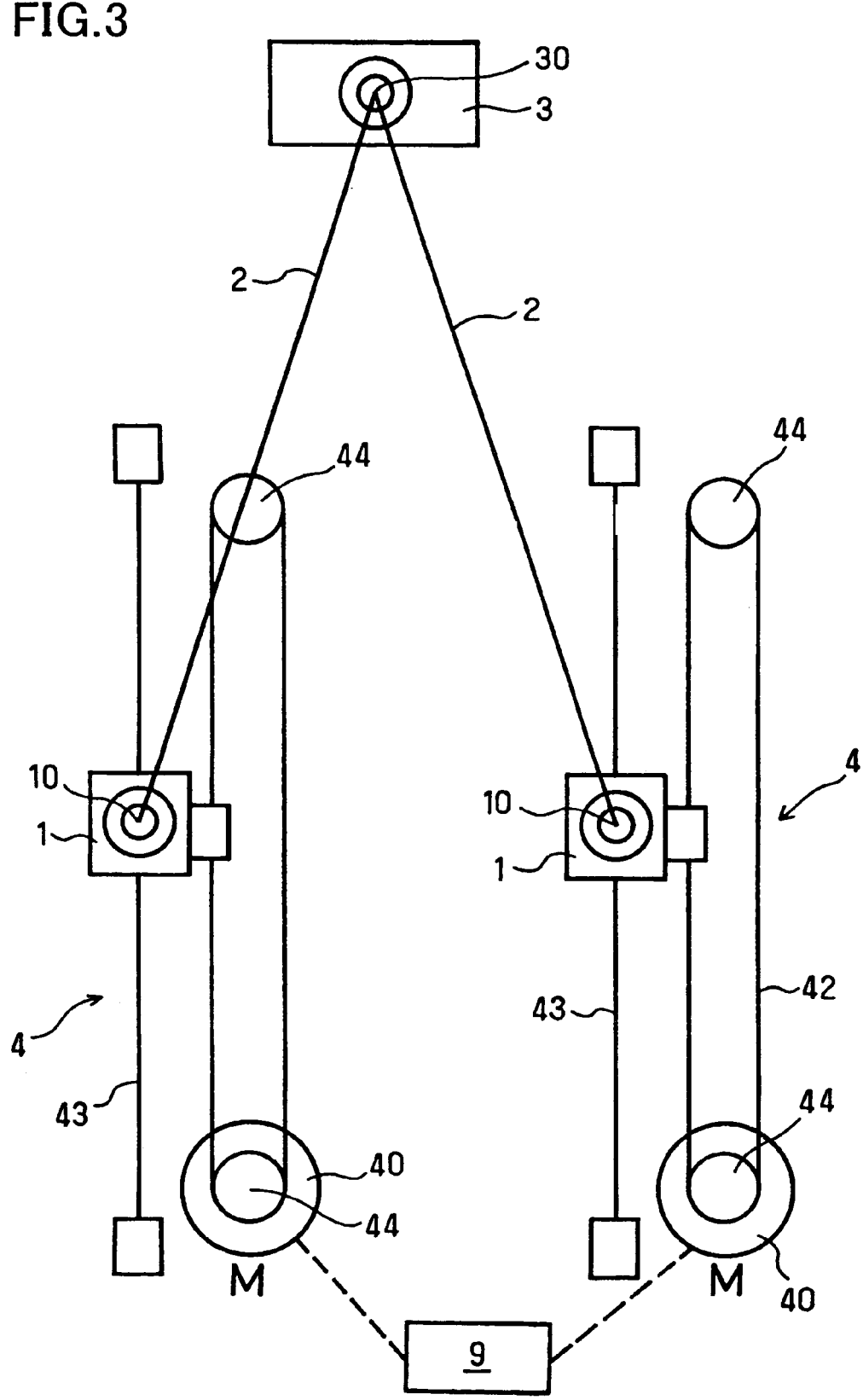
FIG. 3 is a diagram showing another embodiment of the invention.
Figure 4:
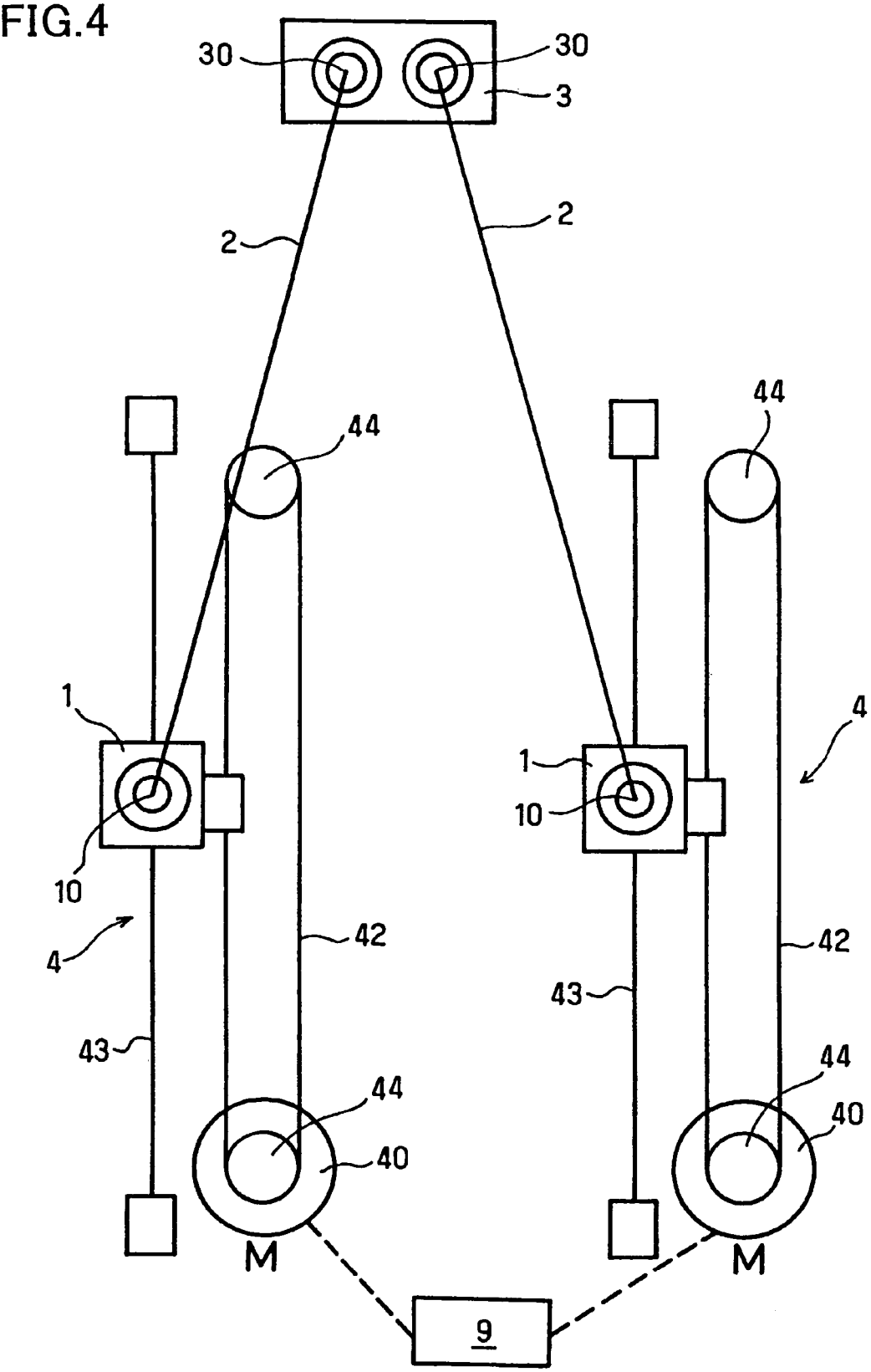
FIG. 4 is a diagram showing another embodiment of the invention.

FIGS. 3 and 4 show belt drive devices in place of the drive devices 4,4. In FIG. 3, the move members 1,1 are mounted to guides 43,43 respectively which are extended in parallel with each other. The move members 1,1 are connected to belts 42,42 respectively which are extended in parallel with the guides 43,43 respectively, so that the move members 1,1 may be moved along the guides 43,43 respectively as the belts 42,42 are moved.

The belt 42 is wound around pulleys 44,44, one of which is rotated by the motor 40, the drive of which is controlled by the control device 9 as is same in the case of the embodiment as described hereinbefore.

FIG. 4 shows another embodiment wherein the arms 2,2 are pivotally connected to the work holder 3 at the pivots 30,30 thereof.

According to the embodiments as described hereinbefore, the rate is 1:1 in the relation between the drive quantity of the motor 40 and the moving quantity of the move member 1. However, a specific mechanism may be provided between the motor 40 and the move member 1 for increasing the moving quantity of the moving member 1.

According to the invention, a specific device may be provided to move the move member 1 in many directions as well as in the to-and-fro directions, thereby to enlarge the moving range of the move member 1.

Figure 5:
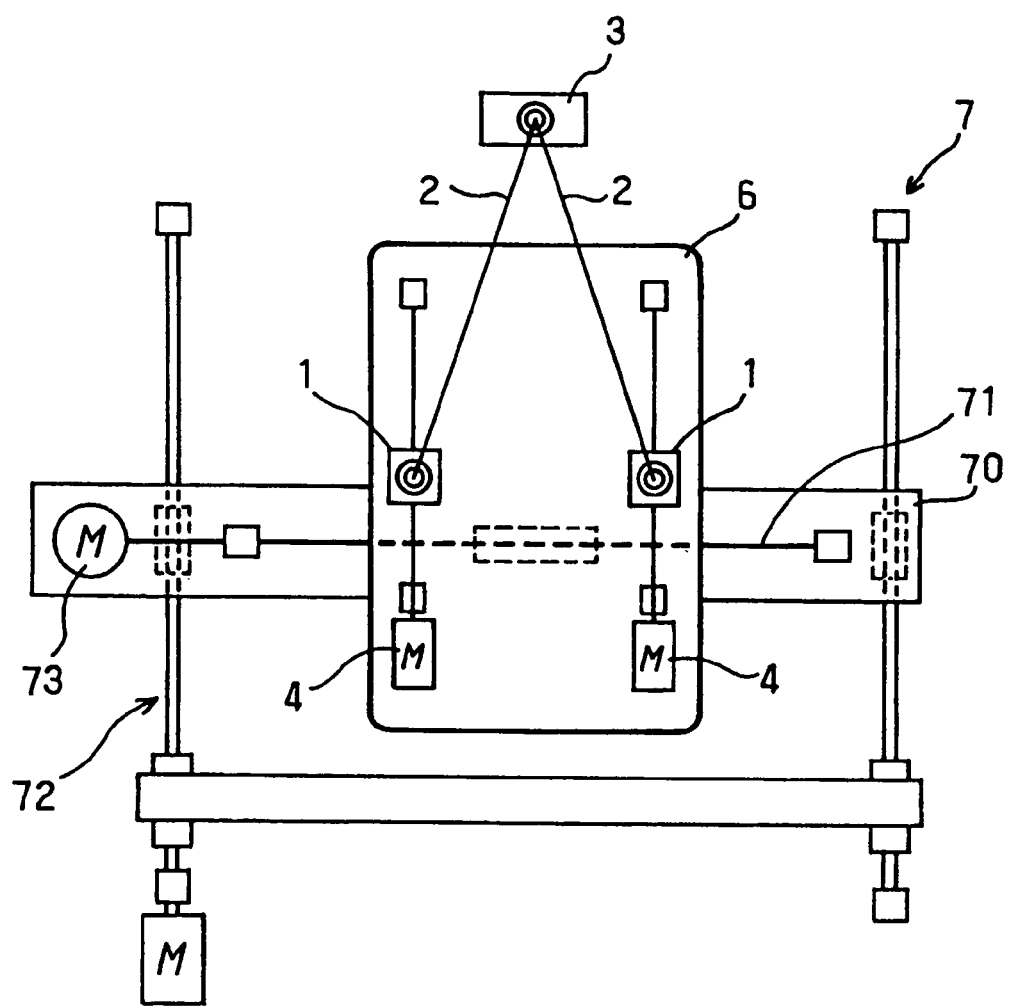
FIG. 5 is a diagram showing another embodiment of the invention.

FIG. 5 shows another embodiment of the invention, wherein an X-Y drive mechanism 7 is provided to additionally increase the X-Y movement of the move member 1. In the embodiment, X-Y drive mechanism 7 includes a base 6 for carrying thereon the move members 1,1, the arms 2,2, the work holder 3 and the drive devices 4,4. The base 6 is mounted on an X-direction rail 71 which is arranged on a Y-direction move base 70. The base 6, therefore, may be moved in the X-direction along the X-direction rail 71 and may be moved also in the Y-direction as the Y-direction move base 70 is moved in the Y-direction. The Y-direction move base 70 may be moved in the Y-direction by a Y-direction drive device 72 such as a ball screw mechanism or the like, and the base 6 may be moved along the X-direction rail 71 in the X-direction by an X-direction drive device 73 such as the ball screw mechanism or the like.

Thus according to the embodiment, the base 6 may be moved to change the relative position of the move members 1,1 in many ways, thereby to enlarge the moving range of the work holder 3.

Figure 6:
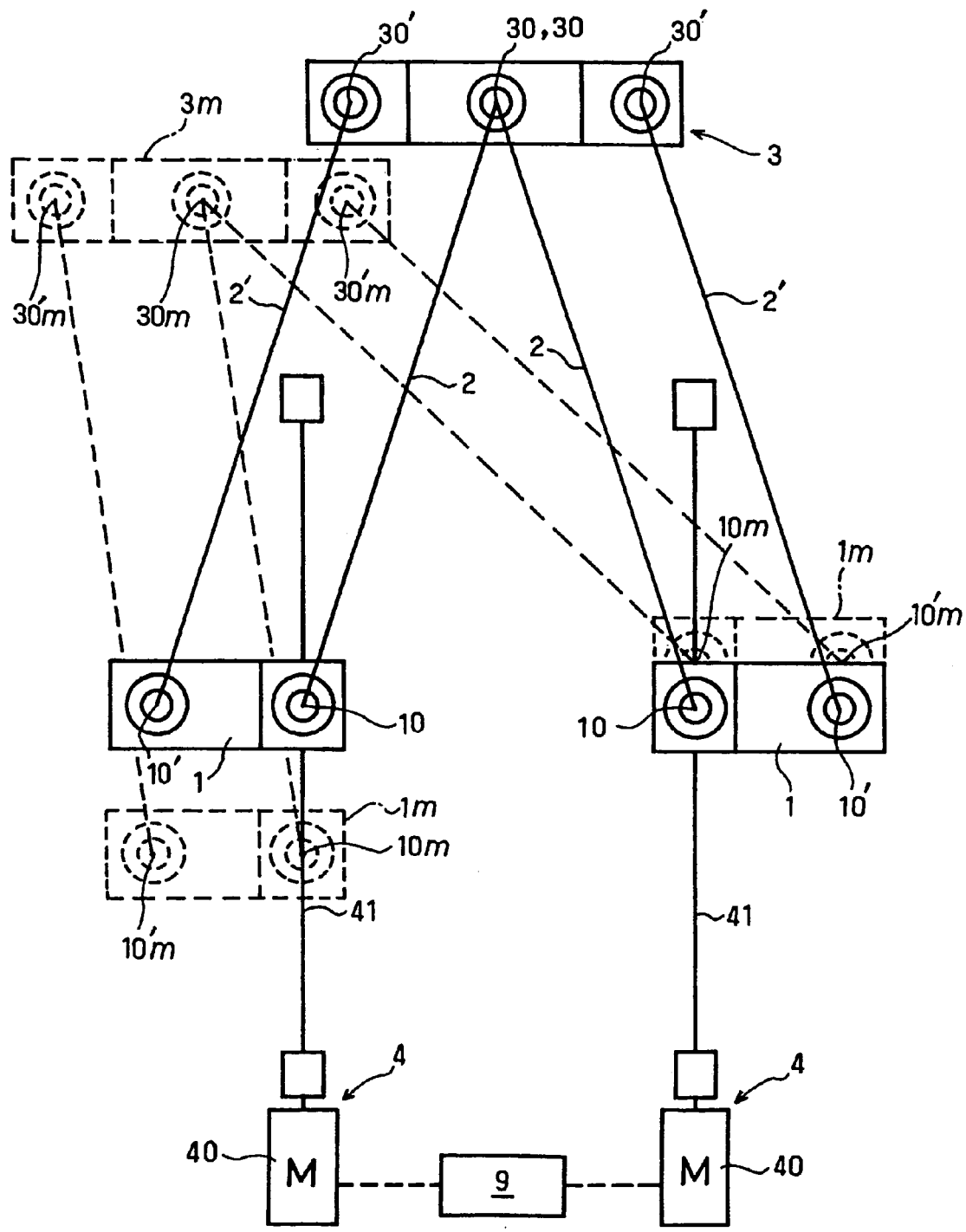
FIG. 6 is a diagram showing another embodiment of the invention.

FIG. 6 shows another embodiment of the invention, wherein second arms 2',2' are provided as extended in parallel with the arms 2,2 respectively, so that the posture of the work holder 3 may be kept in a constant state without being rotated.

Namely, the arms 2,2, which are first links respectively, have one end pivotally connected to the move members 1,1 at the pivots 10,10 thereof respectively. The arms 2,2 are of a same length. The arms 2,2, however, may be of a different length, if necessary.

The arms 2,2 have the opposite end pivotally connected to the work holder 3 at the pivots 30,30 respectively.

Arms 2', 2', which are second links, are provided as extended in parallel with the arms 2,2 respectively. The arms 2', 2' have one end pivotally connected to the move members 1,1 at the pivots 10', 10' thereof respectively. The arms 2', 2' have the opposite end pivotally connected to the work holder 3 at the pivots 30', 30' thereof respectively to stabilize the posture of the work holder 3.

Figure 7:
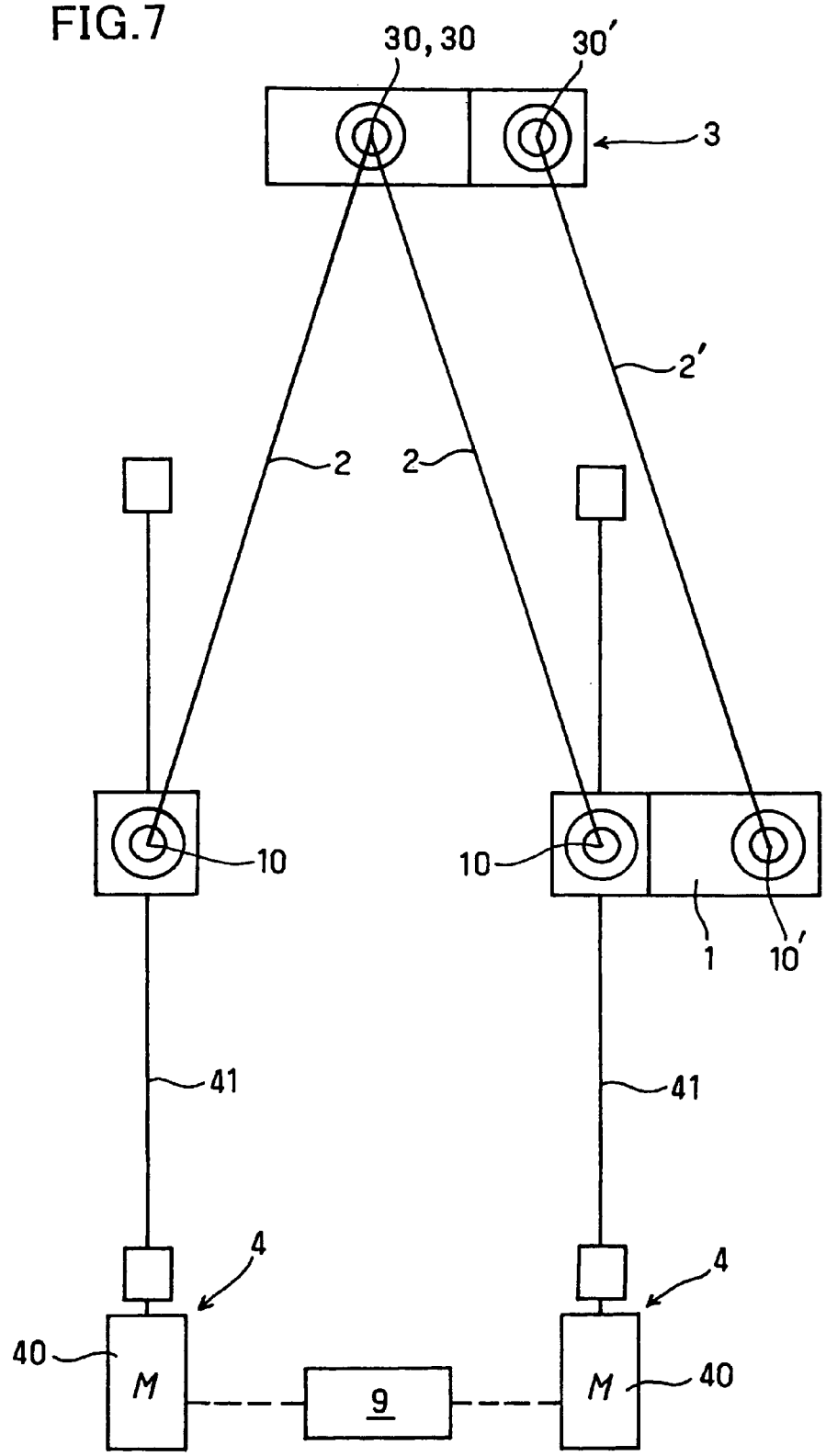
FIG. 7 is a diagram showing another embodiment of the invention.

The arms 2', 2' are of a same length with the arms 2,2 respectively, the arms 2,2 being extended between the pivot 30 of the work holder 3 and the pivots 10,10 respectively. Thus the arms 2,2 and arms 2', 2' form a parallel link mechanism. Therefore, the work holder 3 may always keep a predetermined angular position with respect to the moving direction of the move members 1,1. Namely according to the embodiment, the work holder 3 is always normal to the moving direction of the move members 1,1. More precisely, the work holder 3 will not be rotationally moved. Incidentally, the arm 2' may be provided on the side of only one of the arms 2,2 as shown in FIG. 7.

With this composition, the work holder 3 may be moved to an optional position in a movable plane by regulation of the relative positions of the move members 1,1 by control of the drive of the motors 40,40 by the control device 9. As shown in FIG. 6, in case the move members 1,1 are moved to the positions 1m,1m as shown with the dotted lines respectively, the work holder 3 is moved to the position 3m as shown with the dotted lines where the work holder 3 keeps a same posture owing to the arms 2', 2'.

Incidentally, further in this embodiment, the movable range of the work holder 3 is decided by the moving distance and the space provided between the move members 1,1 and the length of the arms 2,2.

The motor 40,40 may be driven at a different speed to move the work holder 3 along an optional locus.

Figure 8:
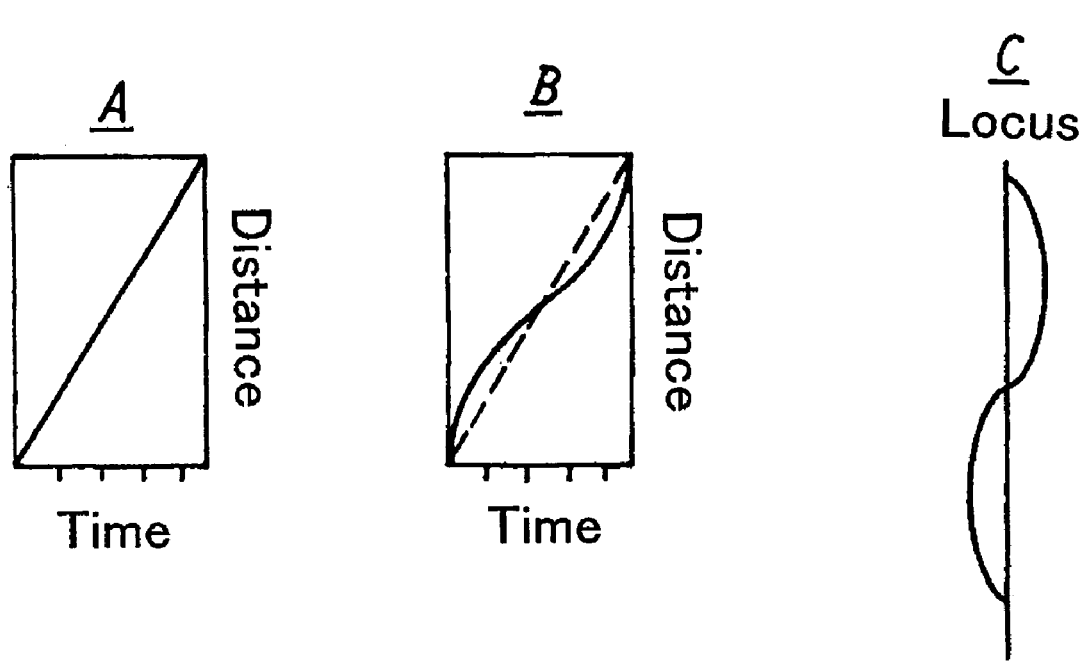
FIG. 8 is an explanatory view showing the operation of the invention.

As is described hereinbefore, for example in FIG. 6, in case the move member 1 on the left side is moved at a constant speed as shown in FIG. 8 (A) while the move member 1 is moved at a varied speed as shown in FIG. 8(B), the work holder 3 is moved with the moving locus that is a curved line as shown in FIG. 8(C).

Figure 9:
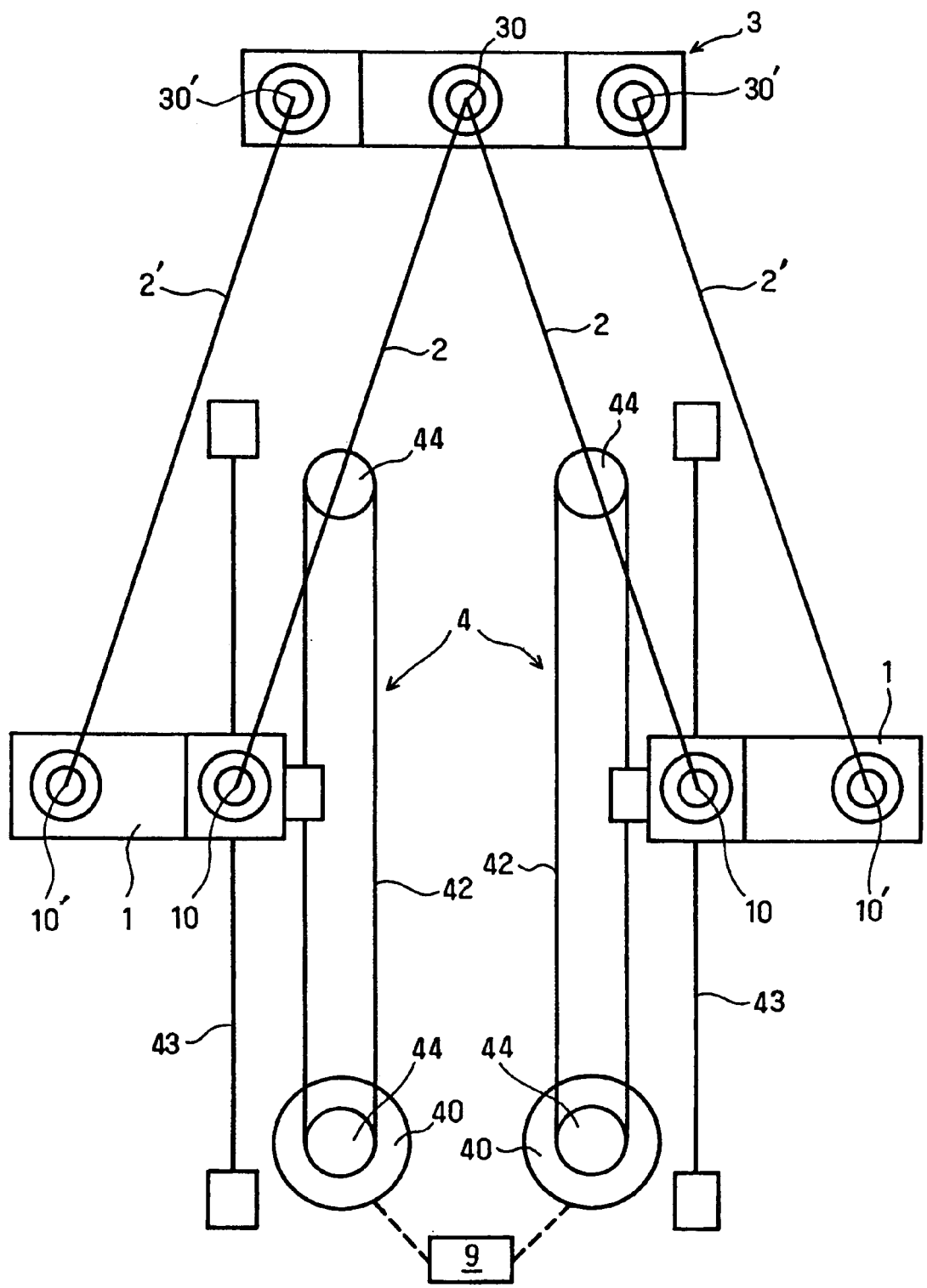
FIG. 9 is a diagram showing another embodiment of the invention.

FIG. 9 shows belt drive devices as the drive devices 4,4.

In FIG. 9, the move members 1,1 are mounted to guides 543,43 respectively which are extended in parallel with each other and are further connected to the belts 42,42 of the belt drive devices 4,4 respectively, so that the move member 1,1 may be along a straight line as the belts 42,42 are moved.

Each of the belt 42 is wound around the pulleys 44,44. One of the pulleys 44,44 is rotated by the motor 40 which is individually driven by the control device 9 as is described hereinbefore.

In this embodiment too, the X-Y derive mechanism is used to move the move member 1 in many directions as well as in the to-and-fro directions, thereby to enlarge the moving range of the move member 1.

Figure 10:
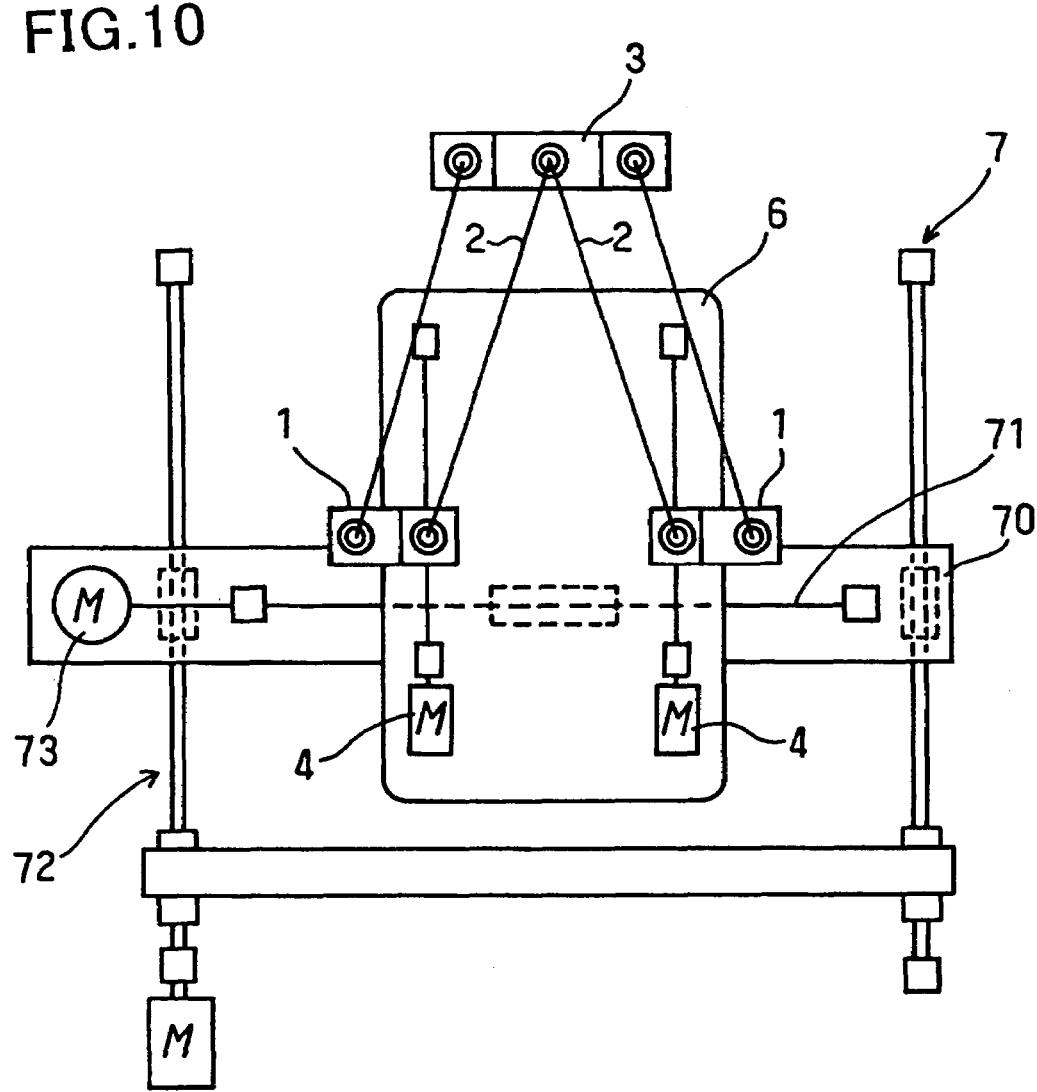
FIG. 10 is a diagram showing another embodiment of the invention.

FIG. 10 shows an embodiment wherein the X-Y drive mechanism 7 is provided to additionally move the move members 1,1 in many directions. In this embodiment, the X-Y drive mechanism 7 includes the base 6 carrying thereon the move members 1,1, the arms 2,2, the work holder 3 and the drive devices 4,4. The base 6 is mounted on the X-direction rail 71 which is arranged on the Y-direction move base 70. The base 6, therefore, may be moved in the X-direction along the X-direction rail 71 and may be moved in the Y-direction as the Y-direction move base 70 is moved in the Y-direction. The Y-direction move base 70 may be moved in the Y-direction by the Y-direction drive device 72 such as a ball screw mechanism or the like, and the base 6 may be driven along the X-direction rail 71 in the X-direction by the X-direction drive device 73 such as the ball screw mechanism or the like.

Thus according to the embodiment, the base 6 may be moved to change the relative position of the move members 1,1 in many ways, thereby to enlarge the moving range of the work holder 3.

Figure 11:
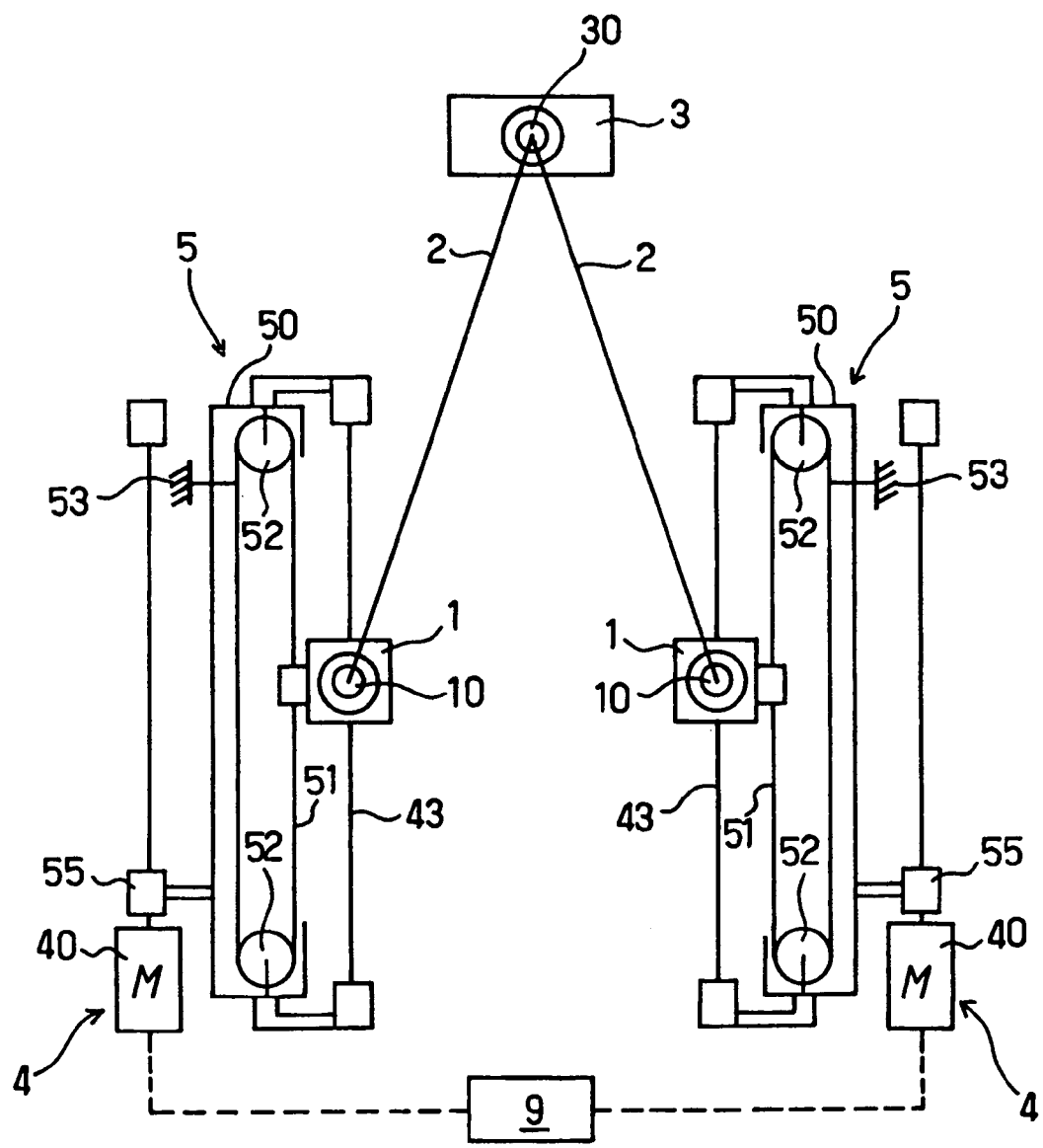
FIG. 11 is a diagram showing another embodiment of the invention.
Figure 12:
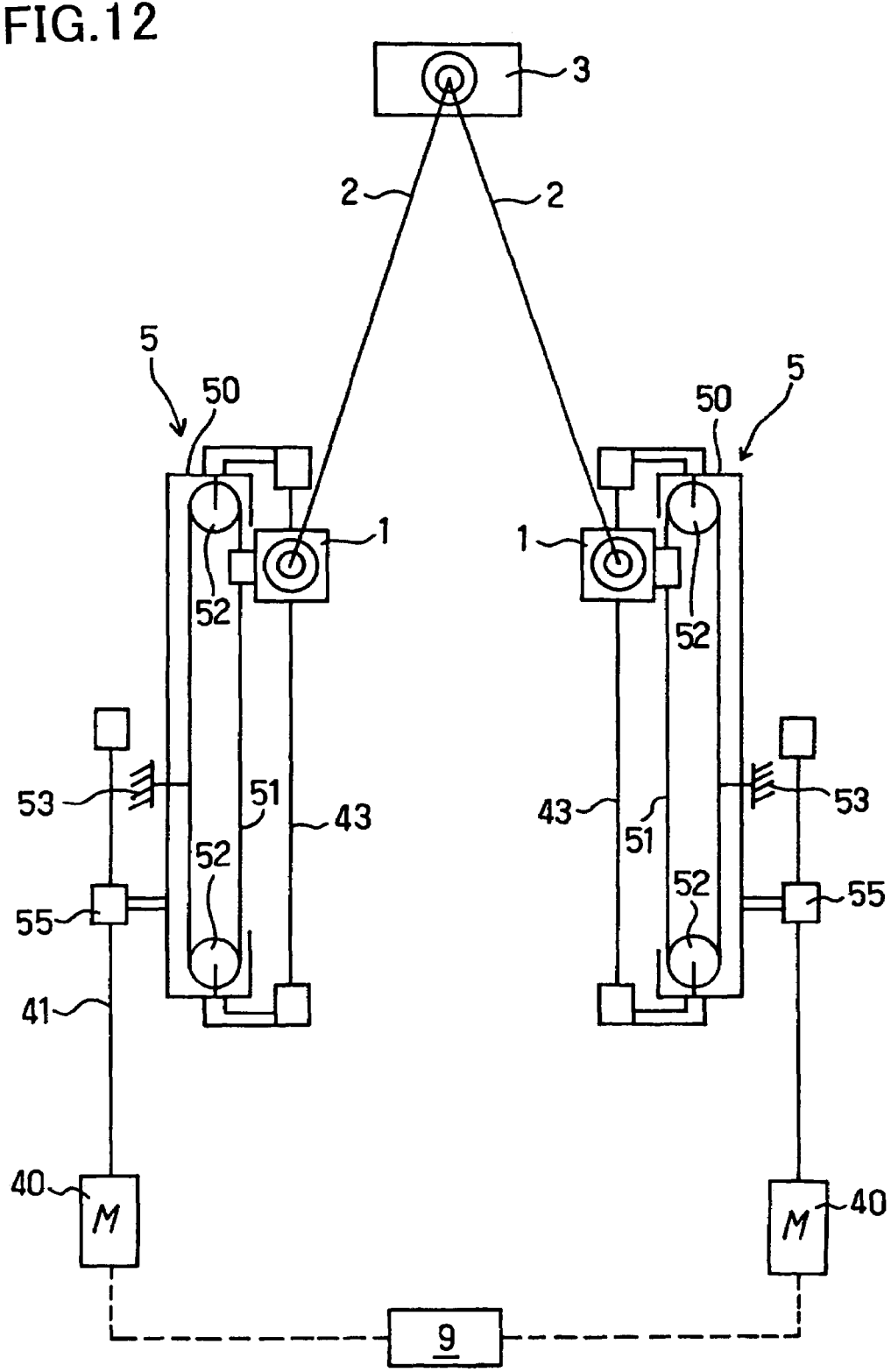
FIG. 12 is a diagram showing the operated state of the embodiment of FIG. 11.

FIGS. 11 and 12 show another embodiment of the invention, wherein a specific mechanism is provided between the motor 40 and the move member 1 for amplifying the moving quantity of the move member 1.

According to the embodiment, amplifying mechanisms 5,5 are provided to move the move members 1,1 respectively which may be movable along the guide 43,43 respectively. The guides 43,43 are mounted on the bases 50,50 of the amplifying mechanism 5 respectively.

The move bases 50,50 are connected to ball screws 41,41 by connecting members 55,55 respectively and may be moved by rotation of motors 40,40 along a straight line.

The move bases 50,50 have pulleys 52,52 provided therewith respectively, and belts 51,51 are wound around the pulleys 52,52 respectively. The move members 1,1 are connected to the belts 51,51 respectively.

The belts 51,51 have one point fixed by fixing members 53,53 to a place outside of the move bases 50,50 respectively, so that the belts 51,51 may be moved around the pulleys 52,52 respectively with the fixed points 53,53 being positionally unchanged while the pulleys 52,52 are moved with the move bases 50,50 along a straight line.

With this composition, the move base 50 may be moved a distance as defined by the length of the ball screw 41 and the belt 51 may be moved the same distance with the move base 50. Therefore, the move member 1 connected to the belt 51 may be moved a distance that is the addition of the movements of the move base 50 and the belt 51 as shown in FIG. 12.

Namely the moving distance of the move member 1 is amplified twice. Moreover with this composition, only the drive device 4 is operated while the amplifying mechanism 5 itself requires no specific driving power.

Incidentally, the amplifying mechanism may be modified in many ways.

Figure 13:
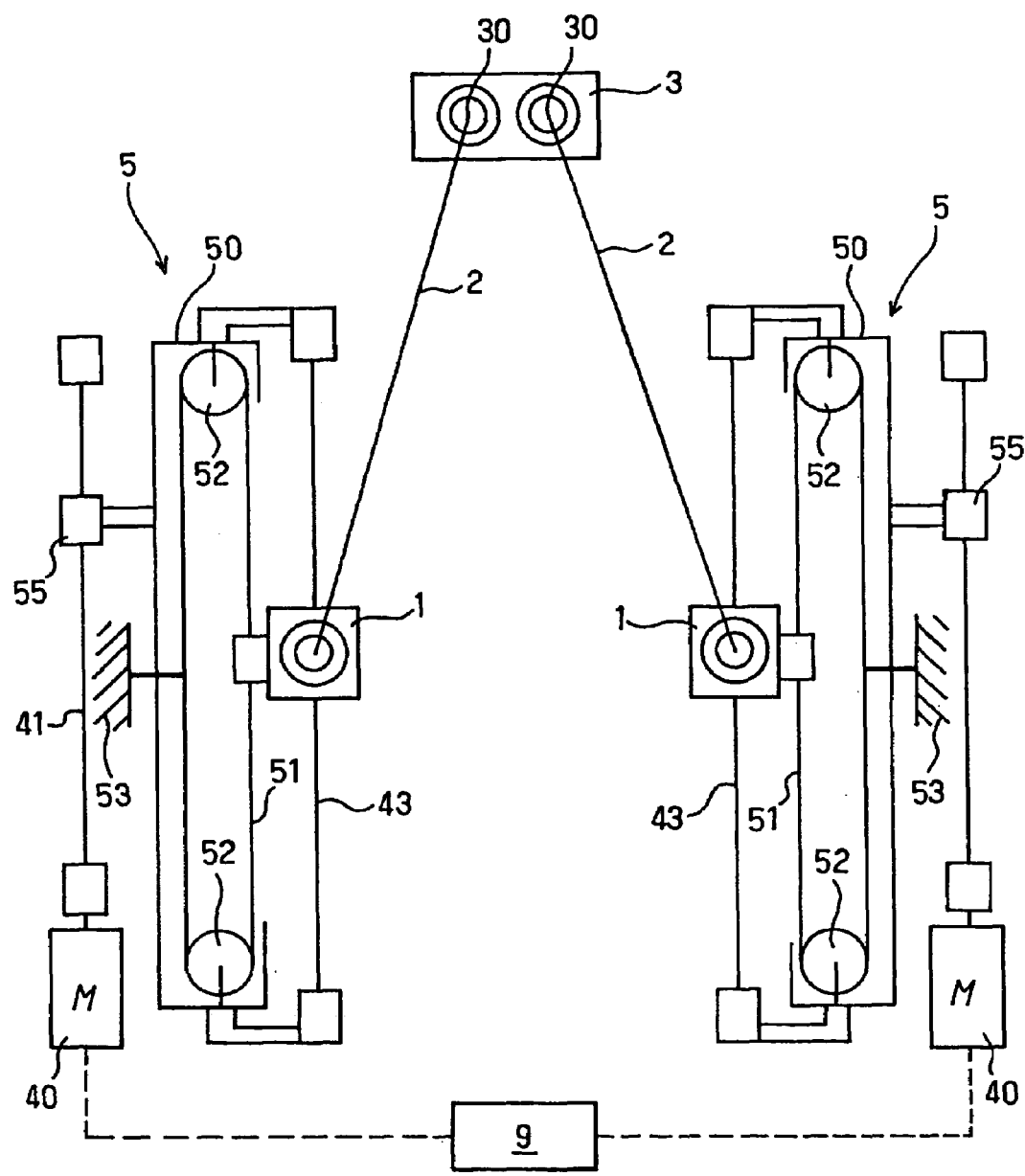
FIG. 13 is a diagram showing another embodiment of the invention.

This embodiment may be modified to have the work holder 3 which has two pivots 30,30 for the arms 2,2, thereby to stabilize the posture of the work holder 3 as shown in FIG. 13.

Figure 14:
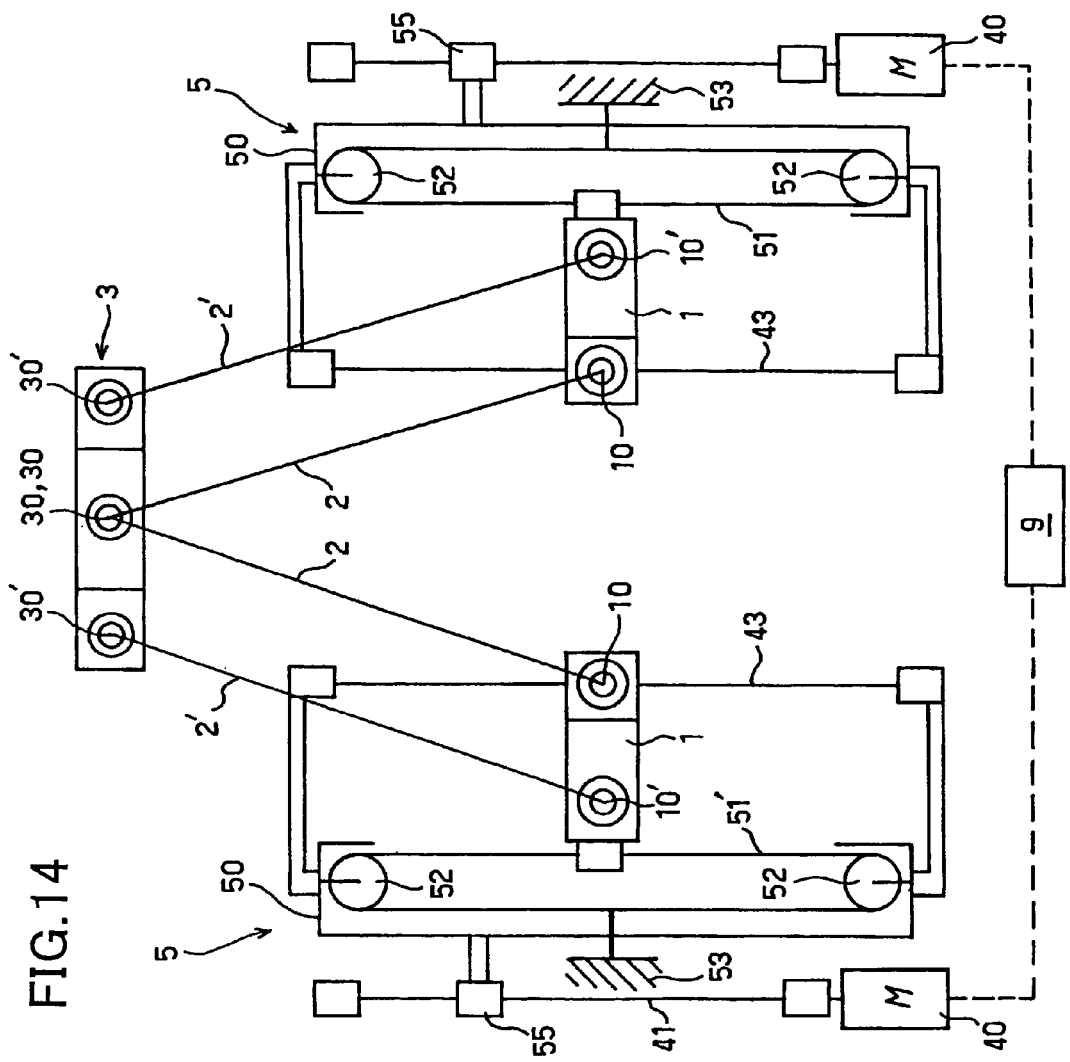
FIG. 14 is a diagram showing another embodiment of the invention.

Further as shown in FIG. 14, second arms 2', 2' may be provided in parallel with the arms 2,2 respectively so as to stabilize the posture of the work holder 3 which may otherwise be rotationally moved. The arms 2', 2' have one end thereof pivotally connected to the move members 1,1 at the pivots 10',10' respectively and have the opposite end thereof pivotally connected to the work holder 3 at the pivots 30',30' respectively.

With this composition, the work holder 3 may maintain a predetermined posture that is normal to the moving direction of the move members 1,1 and will not be rotationally moved.

Figure 15:
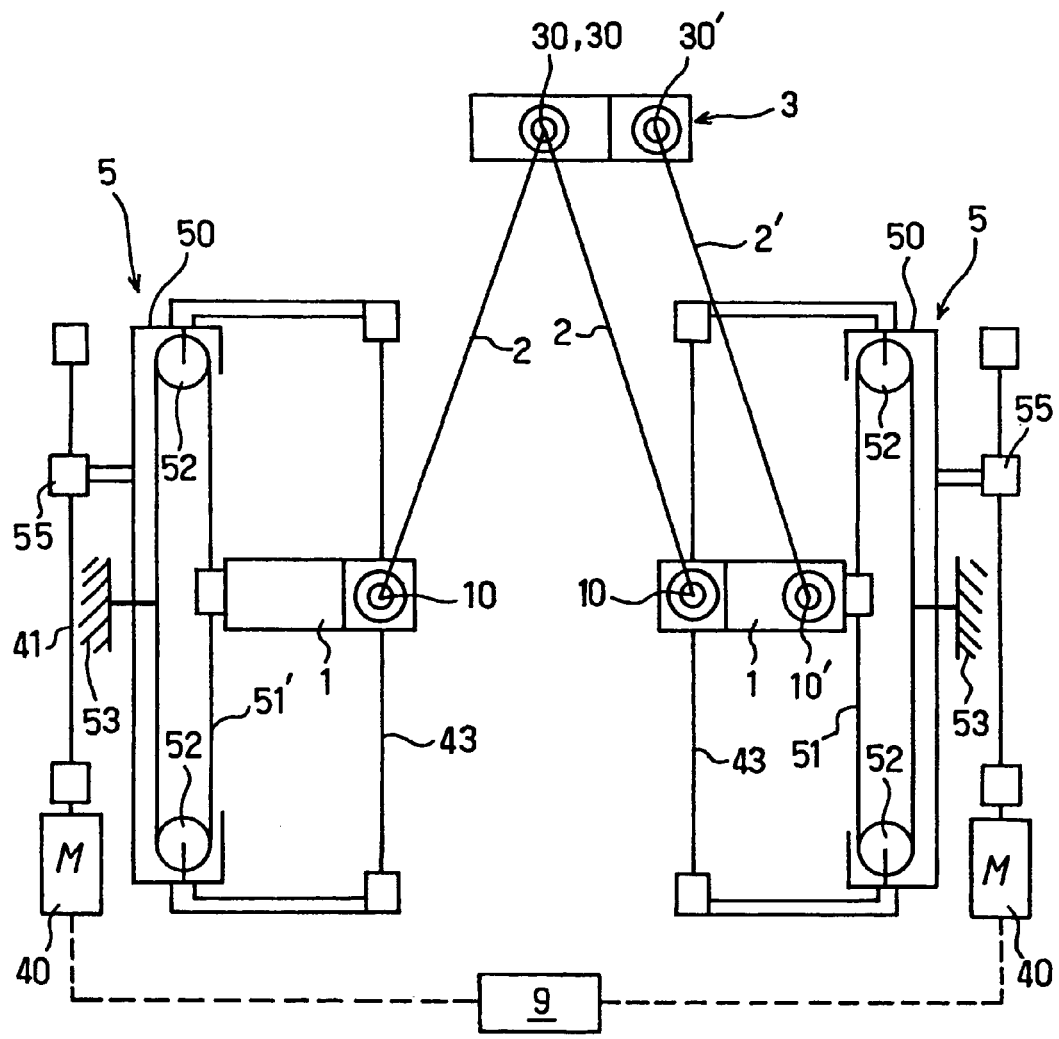
FIG. 15 is a diagram showing another embodiment of the invention.

The second arm 2' may be provided in connection with only one of the arms 2,2 as shown in FIG. 15.

Figure 16:
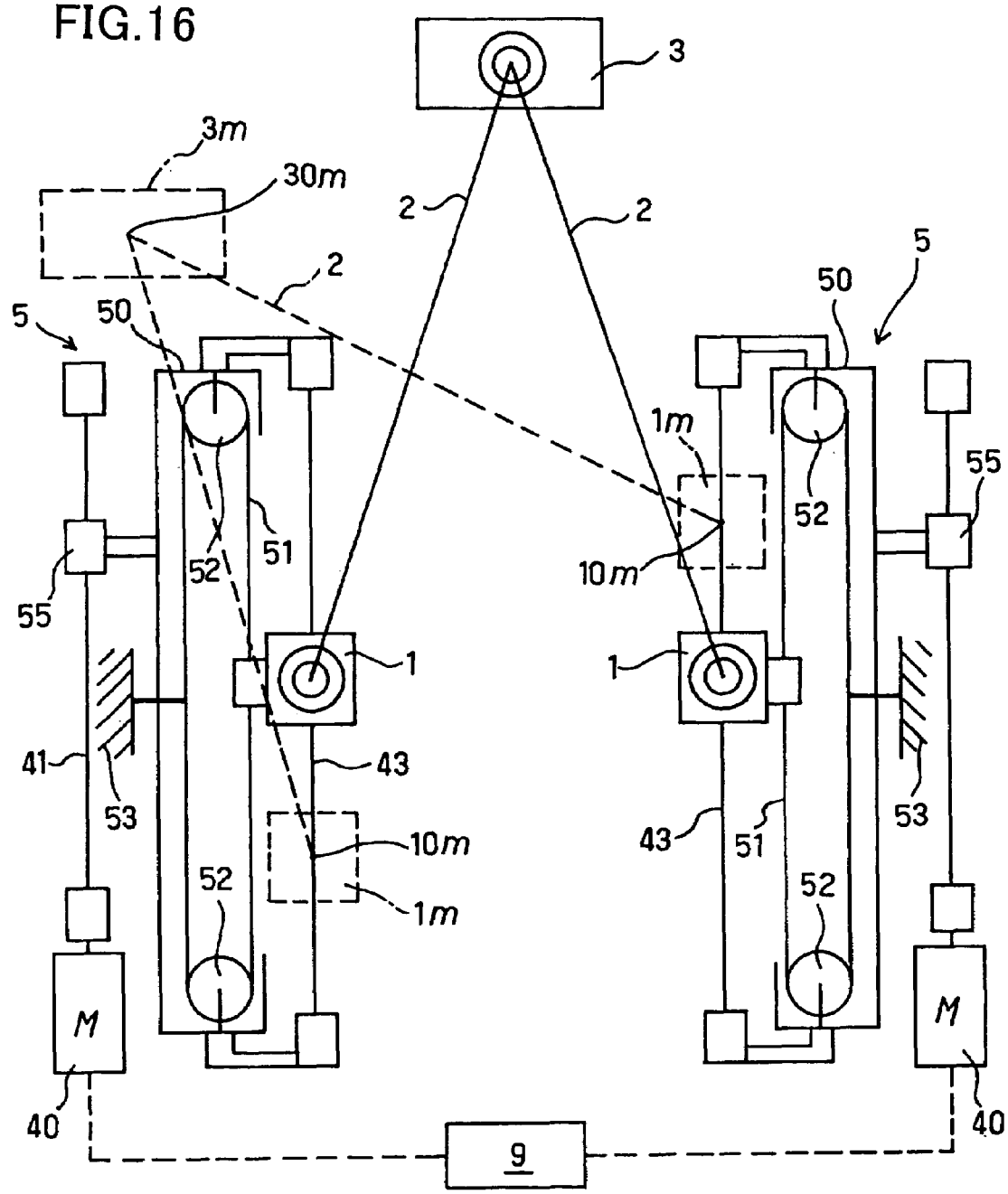
FIG. 16 is a diagram showing another embodiment of the invention.

With this composition, the work holder 3 may be moved to an optional position in the moving plane by controlling the relative positions of the moving members 1,1 through the respective amplifying mechanisms 5,5 under control of the motors 40,40 by means of the control device 9. In FIG. 16, in case the move members 1,1 are moved to the positions 1*m*,1*m* respectively as shown by the dotted lines from the positions as shown by the solid lines, the work holder 3 may be moved to the position 3*m* as shown by the dotted lines from the position as shown by the solid lines.

In this embodiment too, the moving range of the work holder 3 is determined by the moving distance of the move members 1,1, the space provided between the move members 1,1 and the length of the arms 2,2.

Further the work holder 3 may be moved with an optional locus by driving the motors 40,40 at a different speed.

With this embodiment, the moving distance of the work holder 3 may be remarkably amplified by the amplifying mechanism 5 only by moving the connecting member 55 in a limited range as defined by the length of the ball screw 41.

Further, the move members 1,1 may be moved in many directions to enlarge the moving range of the work holder 3.

Figure 17:
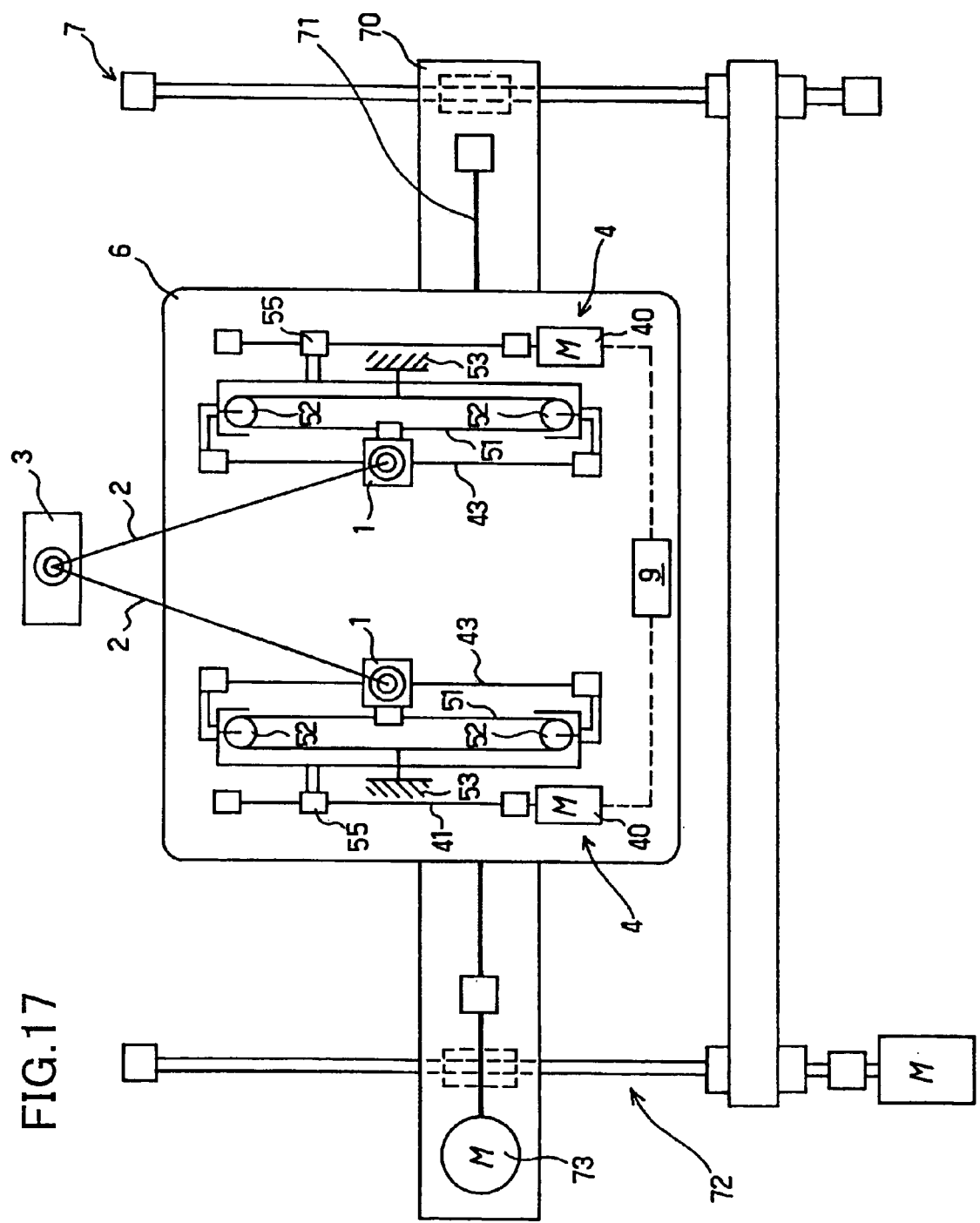
FIG. 17 is a diagram showing another embodiment of the invention.

In FIG. 17, the X-Y drive mechanism 7 is provided to move the move members 1,1 in the X-Y directions. The X-Y drive mechanism 7 includes the base 6 carrying thereon the move members 1,1, the arms 2,2, the work holder 3, the drive devices 4,4 and the amplifying mechanisms 5,5. The base 6 is mounted on the X-direction rail 71 which is arranged on the Y-direction move base 70. The base 6, therefore, may be moved in the X-direction along the X-direction rail 71 and may be moved in the Y-direction as the Y-direction move base 70 is moved in the X-direction. The Y-direction move base 70 may be moved in the Y-direction by the Y-direction drive device 72 such as a ball screw mechanism or the like, and the base 6 may be driven along the X-direction rail 71 in the X-direction by the X-direction drive device 73 such as the ball screw mechanism or the like.

Thus according to the embodiment, the base 6 may be moved to change the relative position of the move members 1,1 in many ways, thereby to enlarge the moving range of the work holder 3.

FIGS. 11 and 12 show another embodiment of the invention, wherein a specific mechanism is provided between the motorn40 and the move member 1 for amplifying the moving quantity of the move member 1.

Figure 18:
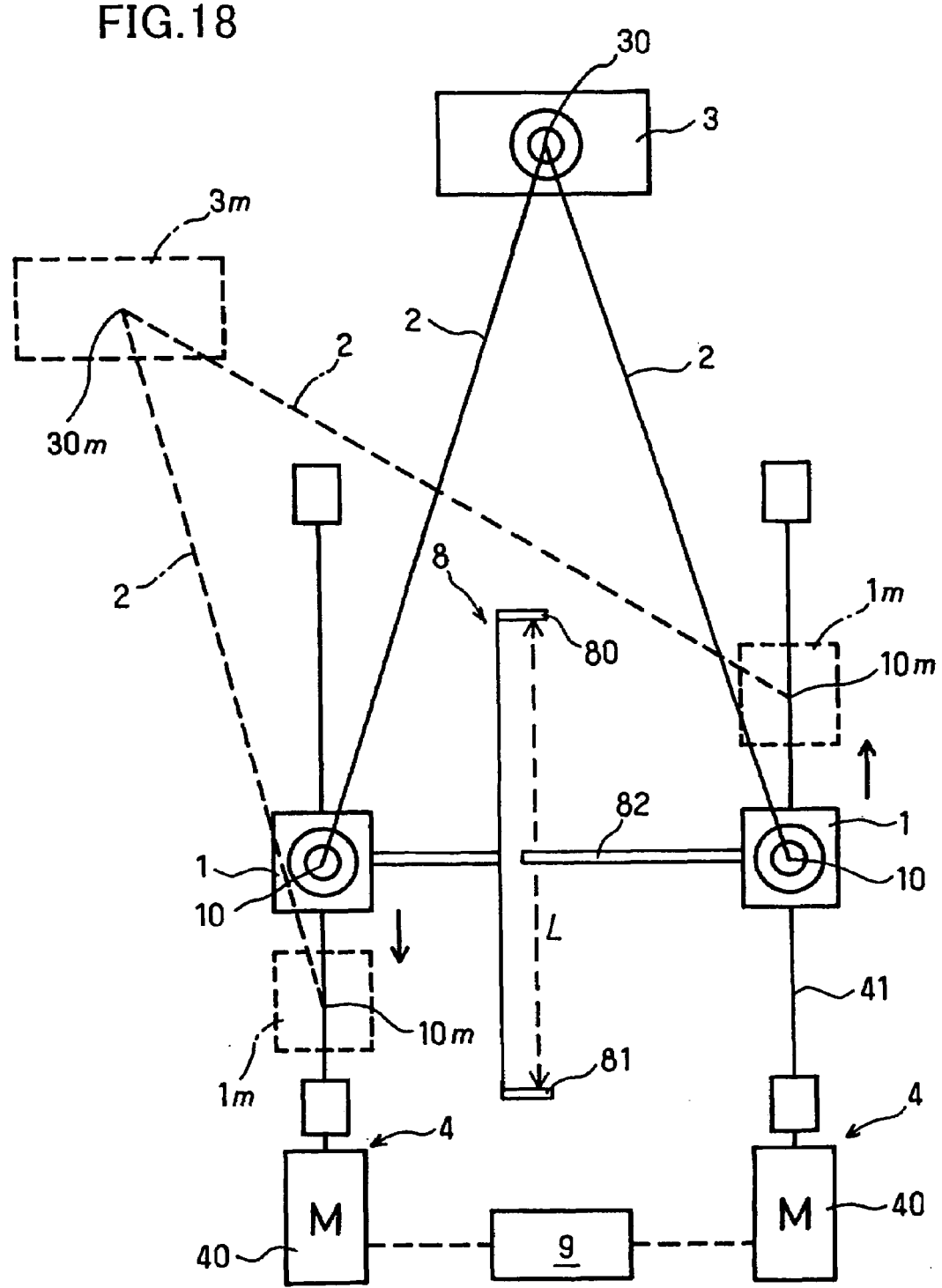
FIG. 18 is a diagram showing another embodiment of the invention.

FIG. 18 shows another embodiment of the invention, wherein a limiting device 8 is provided to regulate the relative positions of the move members 1,1. The limiting device 8 includes stoppers 80,81 which are provided on one of the move members 1,1 and further includes a stopper 82 which is provided on the other of the move members 1,1. The stopper 82 may come to engage the stoppers 80,81 as the move members 1,1 are moved along the ball screws 41,41 respectively. The stoppers 80 and 81 are spaced from each other with a predetermined distance L provided therebetween in the moving direction of the move members 1,1. The stopper 82 may be moved within the predetermined distance L, and the relative movement of the move members 11,11 is limited within the distance L.

With this composition, the positions of the stoppers 80,81,82 may be regulated, thereby to regulate the relative positions of the move members 1,1 and thereby to regulate the straight and pivotal movement of the arms 2,2. Moreover, the arms 2,2 may be prevented from interfering with each other.

With this composition, the motors 40,40 may be driven under control of the control device 9 to regulate the relative positions of the move members 1,1, thereby to move the work holder 3 to an optional position in the movable plane. In FIG. 18, in case the move members 1,1 are moved to the positions 1*m*,1*m* as shown by the dotted lines respectively from the positions shown by the solid lines, the work holder 3 may be moved to the position 3*m* as shown by the dotted lines from the position shown by the solid lines.

Figure 19:
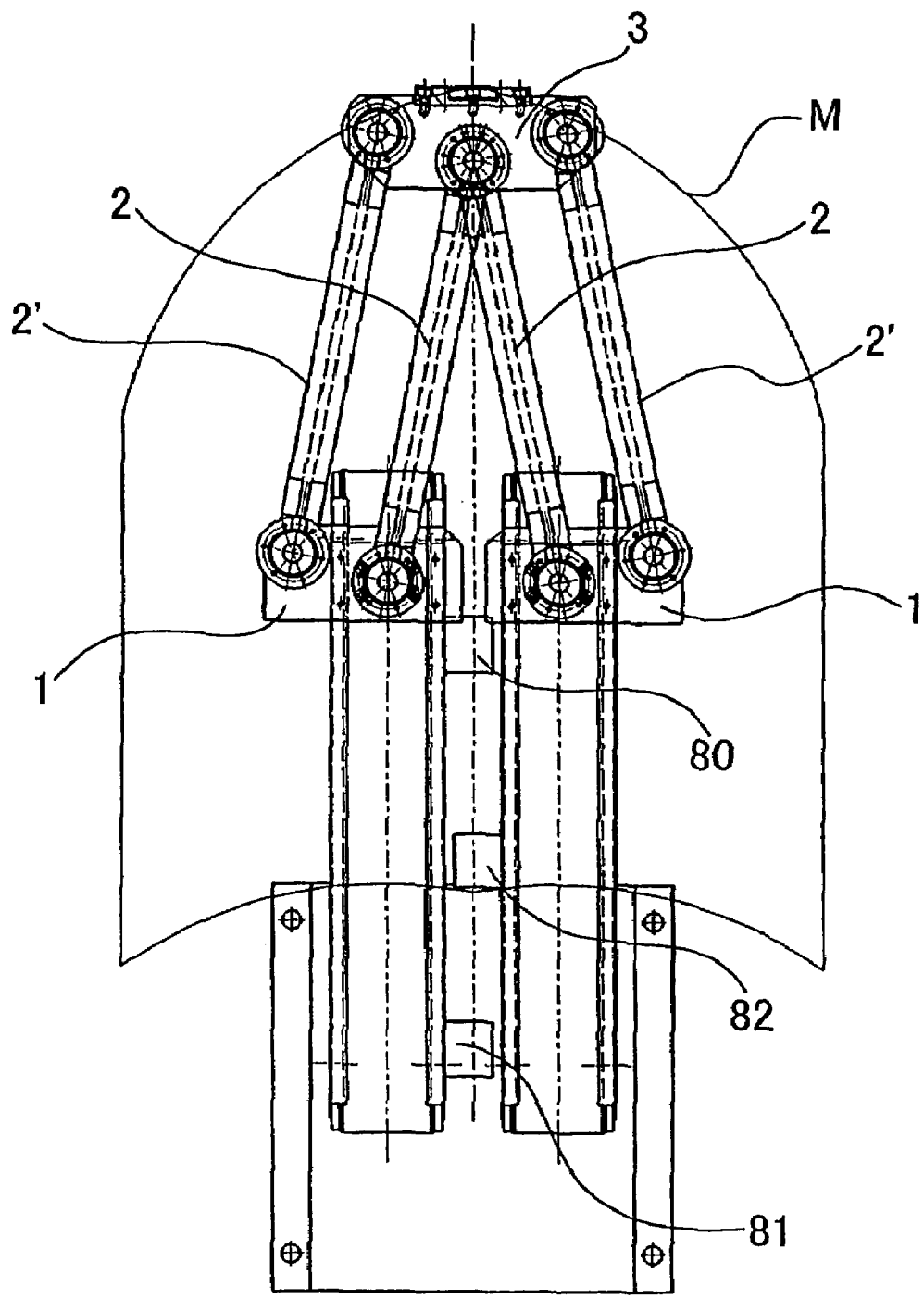
FIG. 19 is a diagram showing another embodiment of the invention.
Figure 20:
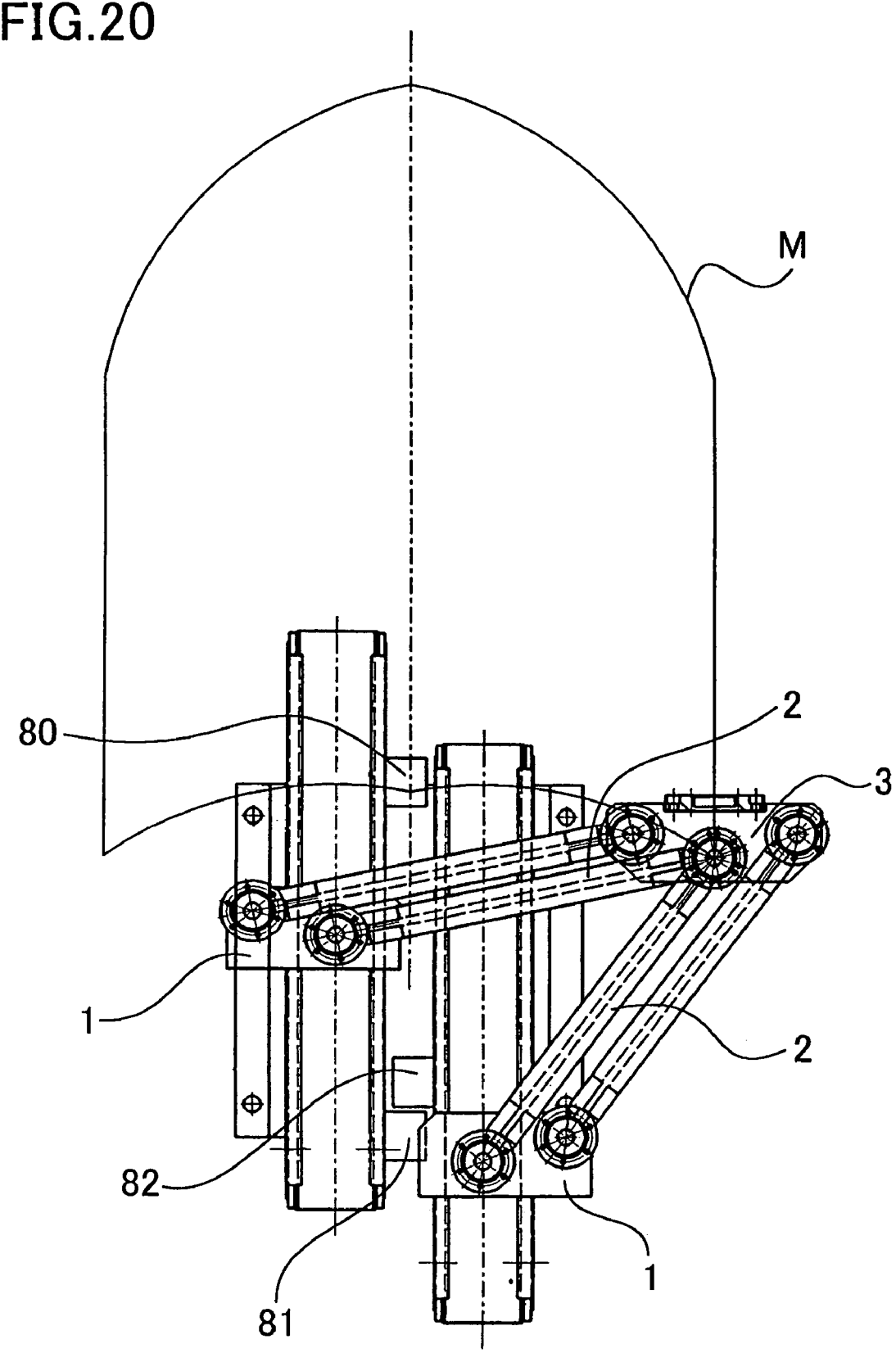
FIG. 20 is a diagram showing another embodiment of the invention.
Figure 21:
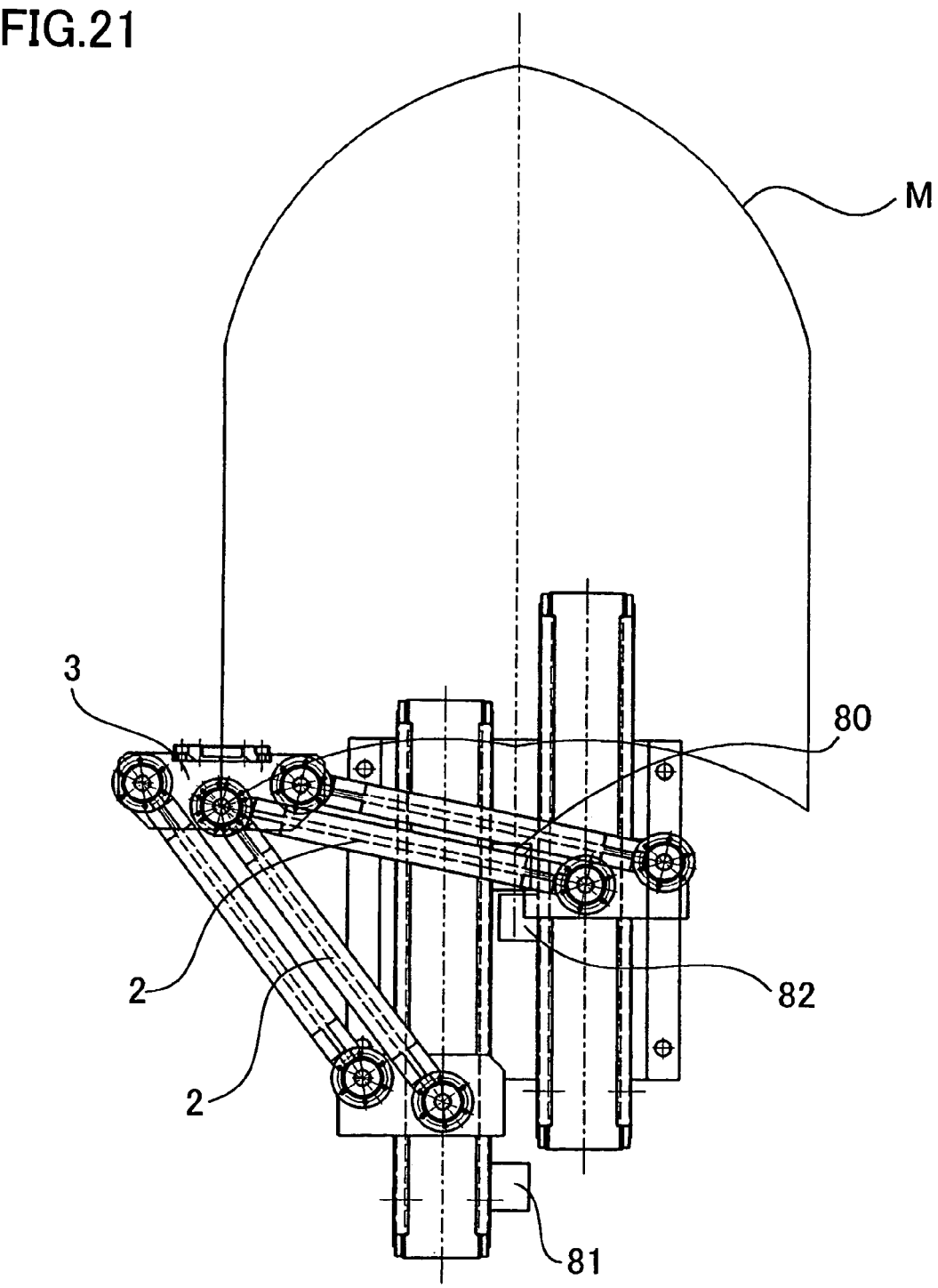
FIG. 21 is a diagram showing another embodiment of the invention.

In this case, the moving range of the work holder 3 is regulated by the limiting device 8. The operation will be described in reference to FIGS. 19 through 21 showing the embodiment having the amplifying mechanism 5 provided therewith as will be described hereinlater. Further the embodiment is provided with a control mechanism for controlling the posture of the work holder 3.

FIG. 20 shows a condition wherein the move members 1,1 are moved from the condition of FIG. 19 and the stopper 82 comes to engage the stopper 81. On the contrary, FIG. 21 shows a condition wherein the move members 1,1 are moved from the condition of FIG. 20 and the stopper 82 comes to engage the stopper 80. The limiting device 8 including the stoppers 80,81,82 is adapted to limit the moving range of the work holder 3 within the range as defined by the reference sign M.

Thus the moving range of the work holder 3 may be optionally determined in dependence upon the way of arrangement of the limiting device 8. Additionally, the arms 2,2 may be prevented from interfering with each other. Further, a danger may be avoided.

Incidentally, the function of the limiting device 8 may be replaced by effectively controlling the drive devices 4,4. For example, the function of the limiting device 8 may be provided as a software in the control device 9.

Figure 22:
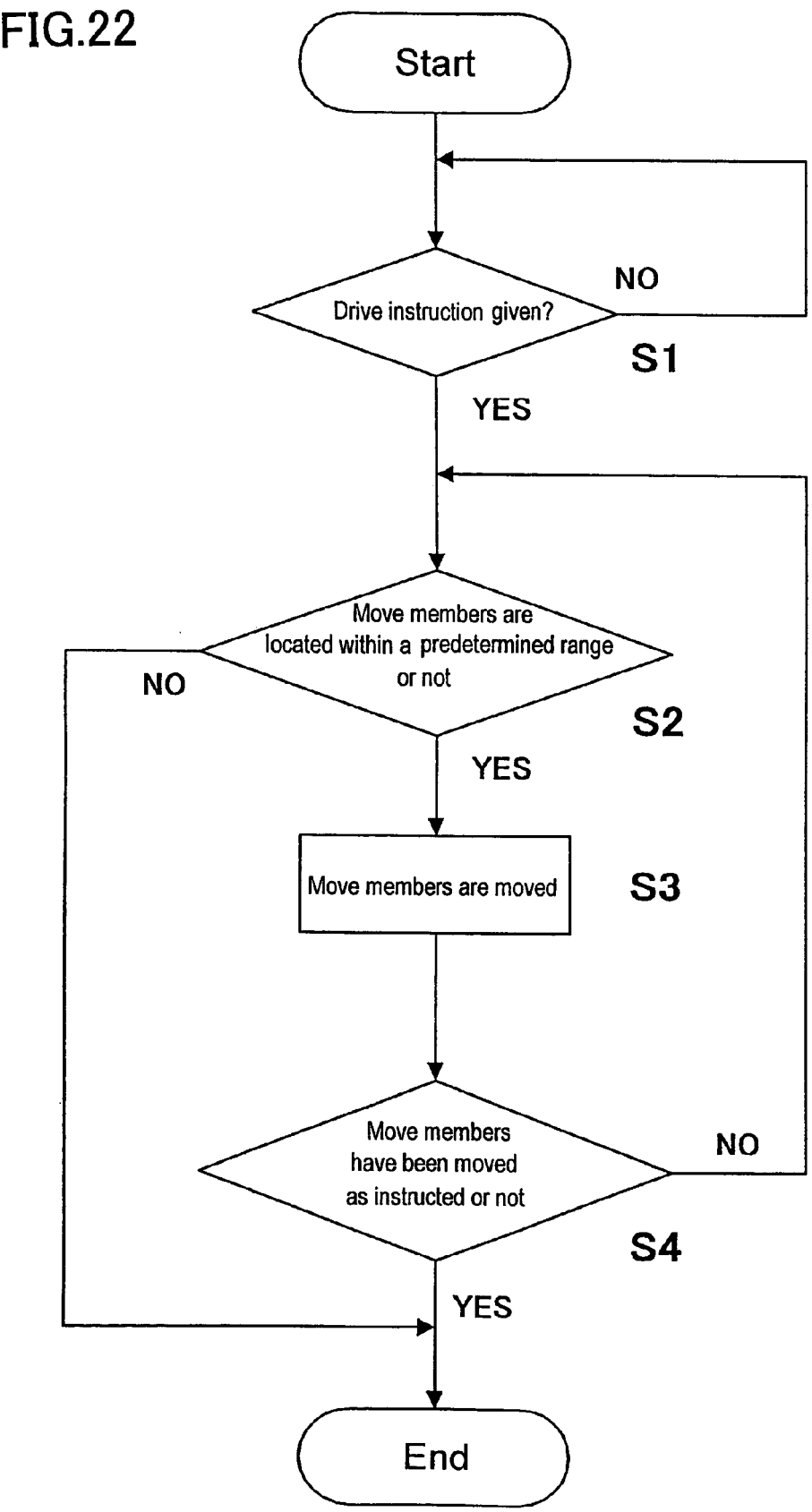
FIG. 22 is a flow chart showing the operation sequence of the invention.

FIG. 22 is a flow chart showing the operation sequence of the embodiment.

When a drive instruction is given (step S1), the limiting device 8 discriminates whether or not the move members 1,1 are located within a predetermined region (step S2). In case the discrimination is "Yes", the drive devices 4, 4 are operated to move the move members 1, 1 (step S3). In case the discrimination is "No", the drive devices 4,4 are not operated and the move members 1, 1 are not moved and the routine comes to End. As the move members 1, 1 are moved the distances respectively as are instructed (step S4), the routine comes to End. In case the move members 1, 1 are not moved the distances respectively as are instructed, the routine comes to the step S2.

Figure 23:
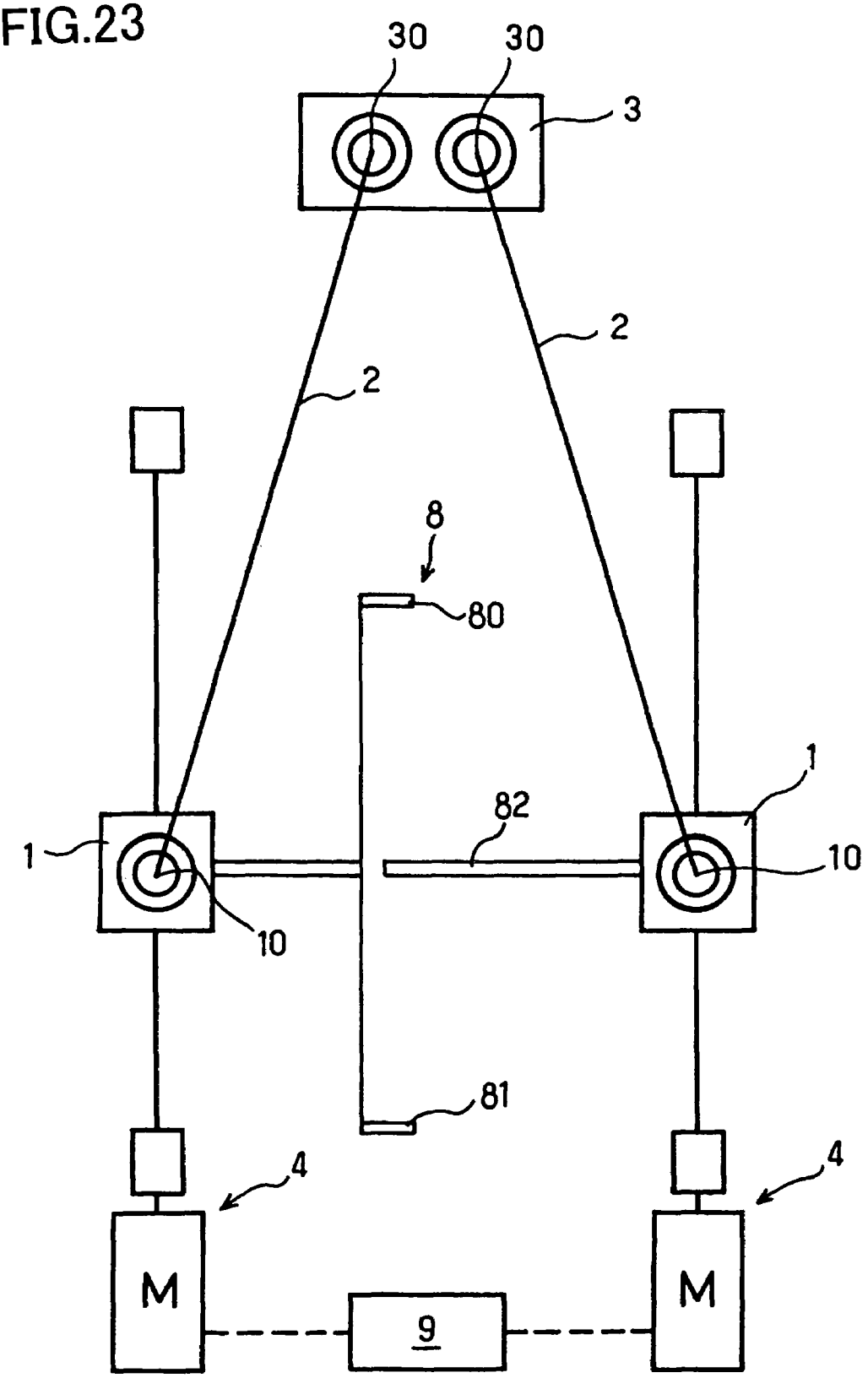
FIG. 23 is a diagram showing another embodiment of the invention.

FIG. 23 shows another embodiment of the invention, wherein the work holder 3 has two pivots 30,30 provided thereat such that the posture of the work holder 3 may be stabilized.

Figure 24:
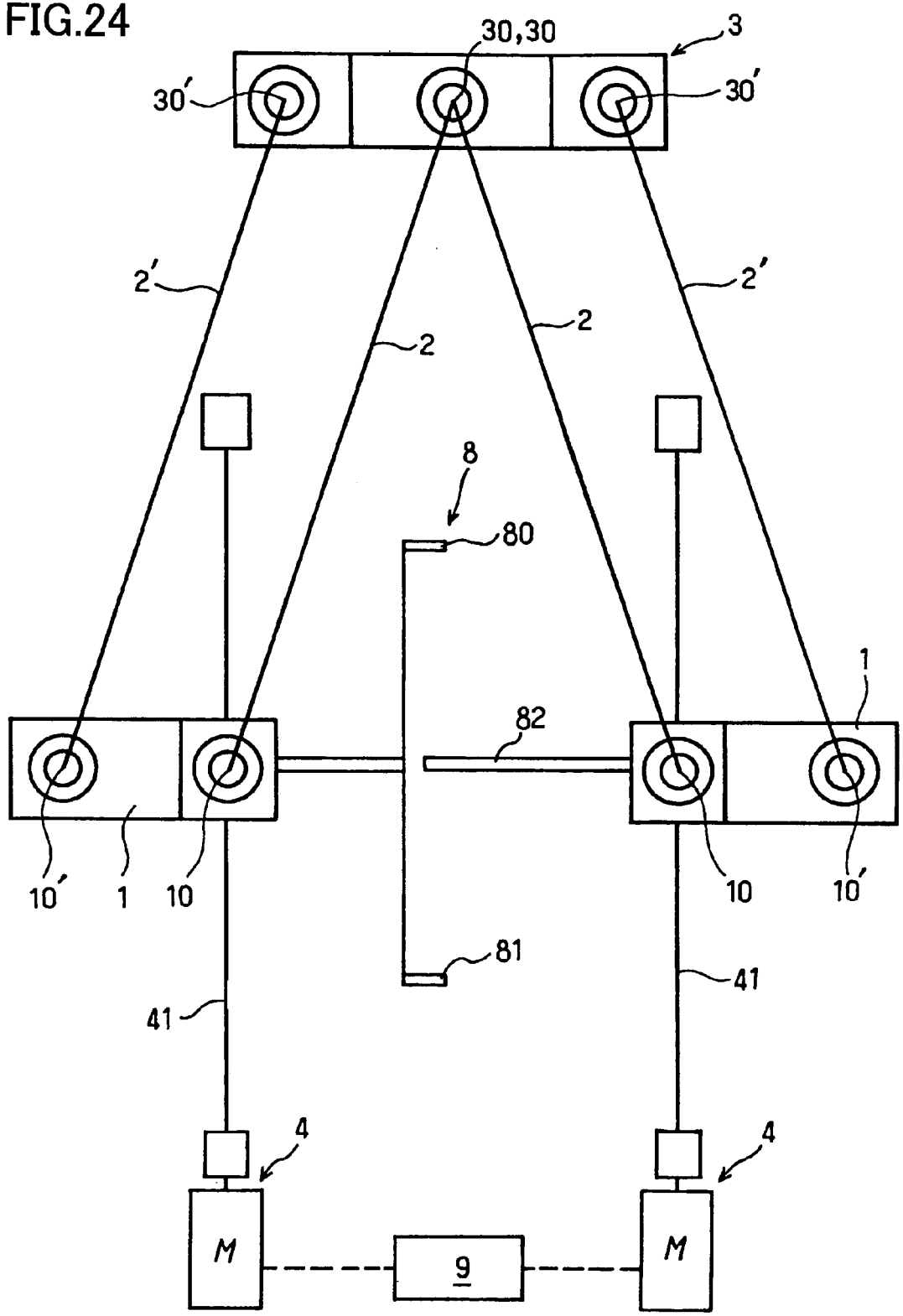
FIG. 24 is a diagram showing another embodiment of the invention.

FIG. 24 shows still another embodiment of the invention, wherein the arms 2,2 have one end pivotally connected to the pivots 10,10 of the move members 1,1 respectively and have the opposite end pivotally connected to the central pivot 30 of the work holder 3, and wherein second arms 2', 2' have one end pivotally connected to the pivots 10', 10' of the move members 1,1 respectively and have the opposite end pivotally connected to one outside pivot 30' and the opposite outside pivot 30' of the work holder 3 respectively, the second arms 2', 2' being extended in parallel with the arms 2,2 respectively.

With this composition, the work holder 3 may maintain a predetermined posture that is normal to the moving direction of the move members 1,1 and will not be rotationally moved.

The second arm 2' may be provided in connection with only one of the arms 2,2.

Figure 25:
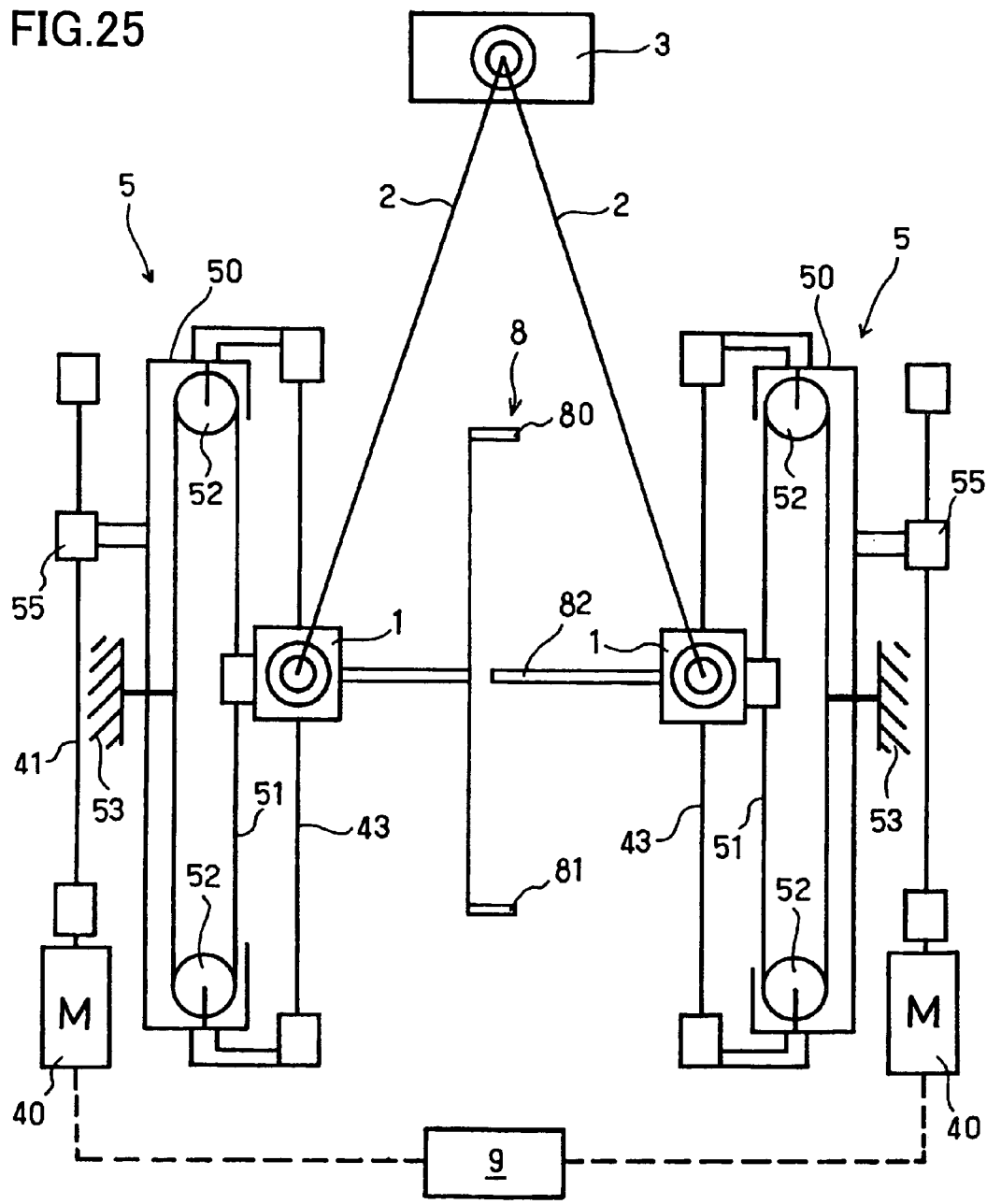
FIG. 25 is a diagram showing another embodiment of the invention.

In this embodiment, a specific mechanism may be provided between the drive device 4 and the move member 1 to amplify the moving quantity of the move member 1 as particularly shown in FIG. 25.

According to the embodiment, amplifying mechanisms 5,5 are provided to move the move members 1,1 respectively which may be movable along the guide 43,43 respectively. The guides 43,43 are mounted to move bases 50,50 of the amplifying mechanism 5 respectively.

The move bases 50,50 are connected to ball screws 41,41 by connecting members 55,55 respectively and may be moved by rotation of motors 40,40 along a straight line.

The move bases 50,50 have pulleys 52,52 provided therewith respectively, and belts 51,51 are wound around the pulleys 52,52 respectively. The move members 1,1 are connected to the belts 51,51 respectively.

The belts 51,51 have one point fixed by fixing members 53,53 to a place outside of the move bases 50,50 respectively, so that the belts 51,51 may be moved around the pulleys 52,52 respectively with the fixed points 53,53 being positionally unchanged while the pulleys 52,52 are moved with the move bases 50,50 along a straight line.

With this composition, the move base 50 may be moved a distance as defined by the length of the ball screw 41 and the belt 51 may be moved the same distance with the move base 50. Therefore, the move member 1 connected to the belt 51 may be moved a distance that is the addition of the movements of the move base 50 and the belt 51.

Namely the moving distance of the move member 1 is amplified twice.

In this embodiment too, the X-Y derive mechanism may be used to move the move members 1, 1 in many directions as well as in the to-and-fro directions, thereby to enlarge the moving range of the move member 1.

Figure 26:
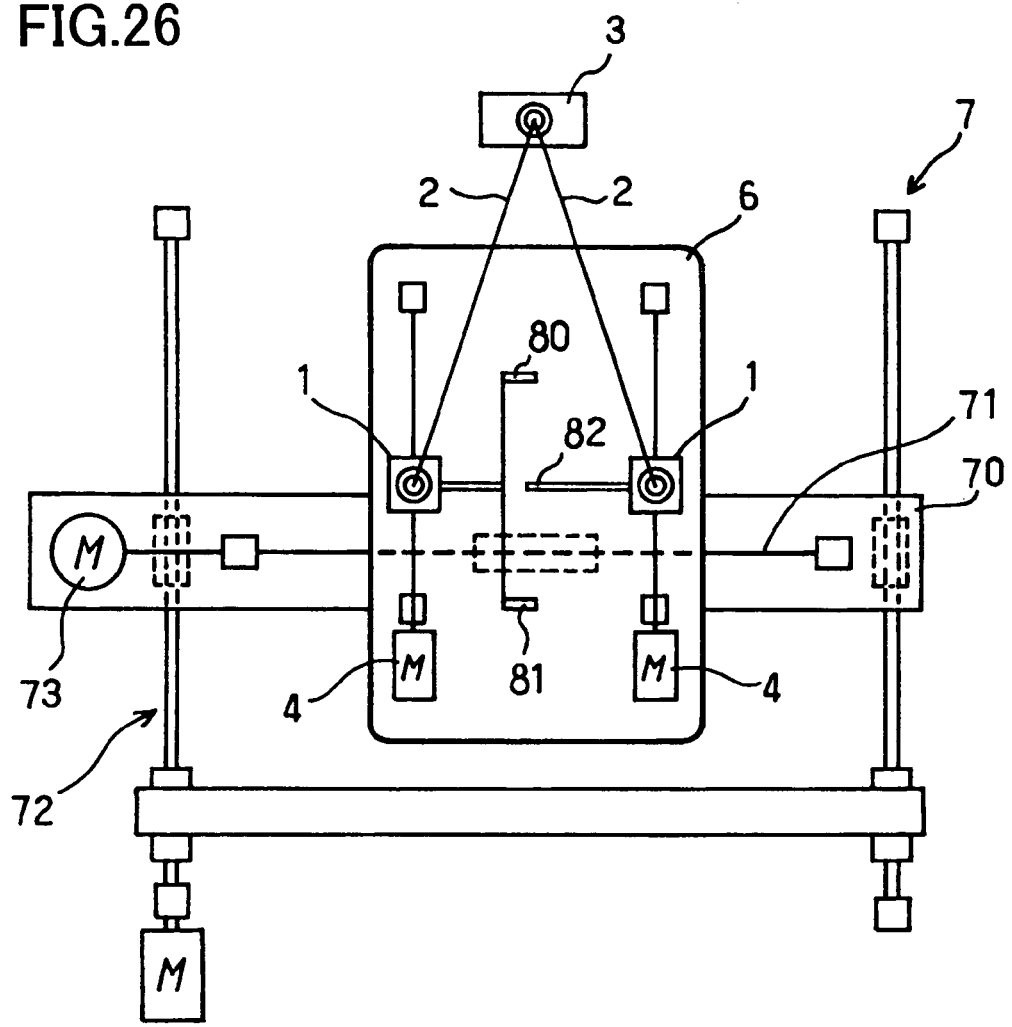
FIG. 26 is a diagram showing another embodiment of the invention.

FIG. 26 shows the embodiment wherein the X-Y drive mechanism 7 is provided to additionally move the move members 1, 1 in many directions. In this embodiment, the X-Y drive mechanism 7 includes the base 6 carrying thereon the move members 1, 1, the arms 2, 2, the work holder 3 and the drive devices 4, 4. The base 6 is mounted on the X-direction rail 71 which is arranged on the Y-direction move base 70. The base 6, therefore, may be moved in the X-direction along the X-direction rail 71 and may be moved in the Y-direction as the Y-direction move base 70 is moved in the Y-direction. The Y-direction move base 70 may be moved in the Y-direction by the Y-direction drive device 72 such as a ball screw mechanism or the like, and the base 6 may be driven along the X-direction rail 71 in the X-direction by the X-direction drive device 73 such as the ball screw mechanism or the like.

Thus according to the embodiment, the base 6 may be moved to change the relative position of the move members 1,1 in many ways, thereby to enlarge the moving range of the work holder 3.

The invention thus described, it will be obvious that the same may be varied in many ways. Such variations are not to be regarded as a departure from the spirit and scope of the invention, and all such modifications are intended to be included within the scope of the following claims.

What is claimed is:

1. A robot comprising:
   two move members which are arranged as being movable in a plane along different lines;
   at least two links, each of which has one end pivotally connected to each of said move members;
   a work holder pivotally connected to the opposite end of each of said links;
   drive means for independently driving said move members;
   control means for controlling the operation of said drive means; and
   an amplifying means for amplifying the drive distance of said move members which are driven by said drive means.

2. The robot as defined in claim 1, wherein said amplifying means is driven by said drive means to amplify the drive distance of said move members.

3. The robot as defined in claim 1, further comprising a limiting means for regulating the relative positions of said move members in a predetermined range.

4. The robot as defined in claim 3, wherein said limiting means includes stopper means for physically regulating the movement of said move members.

5. The robot as defined in claim 3, wherein said limiting means controls the operation of said drive means to regulate the relative positions of said two move members in a predetermined range.

6. The robot as defined in claim 1, further comprising:
   a parallel link parallel to at least one of said two links, having one end pivotally connected to said move members and an opposite end pivotally connected to the work holder.

7. The robot as defined in claim 6, wherein said two links are of a same length.

8. The robot as defined in claim 6, wherein said two links are of a different length.

9. The robot as defined in claim 6, wherein said two links are pivotally connected to said work holder at a same pivot thereof.

10. The robot as defined in any one of claims 1, 3 and 6, wherein said move members are moved along a straight line.

11. The robot as defined in any one of claims 1, 3 and 6, wherein said move members are moved in parallel with each other.

12. The robot as defined in any one of claims 1 and 3, wherein at least said two links are of a same length.

13. The robot as defined in any one of claims 1, and 3, wherein at least said two links are of a different length.

14. The robot as defined in any one of claims 1 and 3, wherein at least said two links are pivotally connected to said work holder at the pivots thereof of different positions.

15. The robot as defined in any one of claims 1 and 3, wherein at least said two links are pivotally connected to said work holder at a same pivot thereof.

16. The robot as defined in any one of claims 1, 3 and 6, wherein said drive means drives said two move members at a different speed.

17. The robot as defined in any one of claims 1, 3 and 6, wherein said move members are mounted on a movable member.

* * * * *